(12) United States Patent
Sears et al.

(10) Patent No.: US 12,399,191 B2
(45) Date of Patent: Aug. 26, 2025

(54) HISTOLOGICAL TISSUE SPECIMEN PROCESSING

(71) Applicant: LEICA BIOSYSTEMS MELBOURNE PTY LTD, Mount Waverley (AU)

(72) Inventors: Gordon Sears, Victoria (AU); Michael Houston Drummond, Victoria (AU); Donnchadh Oh-Ainle, Victoria (AU)

(73) Assignee: LEICA BIOSYSTEMS MELBOURNE PTY LTD, Mount Waverley (AU)

( * ) Notice: Subject to any disclaimer, the term of this patent is extended or adjusted under 35 U.S.C. 154(b) by 0 days.

(21) Appl. No.: 17/872,953

(22) Filed: Jul. 25, 2022

(65) Prior Publication Data

US 2023/0061034 A1    Mar. 2, 2023

Related U.S. Application Data

(63) Continuation of application No. 16/621,362, filed as application No. PCT/AU2018/050892 on Aug. 22, 2018, now Pat. No. 11,428,700.

(Continued)

(51) Int. Cl.
*G01N 1/31* (2006.01)
*G01N 35/00* (2006.01)

(52) U.S. Cl.
CPC ......... *G01N 35/00663* (2013.01); *G01N 1/31* (2013.01); *G01N 2001/315* (2013.01); *G01N 2035/00673* (2013.01)

(58) Field of Classification Search
CPC ... G01N 2035/00673; G01N 2001/315; G01N 1/31; G01N 35/00663; G01N 1/30; B65D 2501/24057; B65D 2501/24; B65D 71/406

See application file for complete search history.

(56) References Cited

U.S. PATENT DOCUMENTS 3,995,803 A * 12/1976 Uitz ........................... B62J 9/21
                                                                294/142
5,127,537 A *  7/1992 Graham .................. G01N 1/36
                                                                220/838

(Continued)

FOREIGN PATENT DOCUMENTS

CA          626268 A      8/1961
CN       101351153 A      1/2009

(Continued)

OTHER PUBLICATIONS

Extended European Search Report dated Feb. 5, 2021 from the European Patent Office in EP Application No. 18849016.3.

(Continued)

*Primary Examiner* — Elizabeth A Robinson
*Assistant Examiner* — Tingchen Shi
(74) *Attorney, Agent, or Firm* — Kinney & Lange, P.A.

(57) ABSTRACT

A method of operating a tissue processor for processing tissue samples is provided. The tissue processor includes at least one retort for receiving tissue samples, at least one container for storing a reagent, and at least one sensor arranged for fluid communication with one or both of the at least one container and the at least one retort for measuring a measured purity level of a reagent. The method includes the steps of conducting reagent from the at least one container or the at least one retort to the at least one sensor, automatically measuring, by means of the at least one sensor, a measured purity level of the reagent, checking whether the measured purity level meets a predetermined purity level of the reagent associated with the at least one container, and automatically determining, based on a result of checking, whether the reagent is suitable for processing tissue samples in the tissue processor. A tissue processor for processing tissue samples is also provided. A container is (Continued)

also provided for storing tissue samples for processing in a tissue processor.

14 Claims, 17 Drawing Sheets

Related U.S. Application Data

(60) Provisional application No. 62/548,638, filed on Aug. 22, 2017.

(56) References Cited

U.S. PATENT DOCUMENTS

| | | | | |
|---|---|---|---|---|
| 5,427,308 | A | * | 6/1995 | Swift ................... B65D 5/68 229/114 |
| 6,047,976 | A | * | 4/2000 | Wang ................... A45C 11/20 280/37 |
| 8,288,086 | B2 | | 10/2012 | Metzner et al. |
| 8,309,037 | B2 | | 11/2012 | Erben et al. |
| 2006/0148063 | A1 | | 7/2006 | Fauzzi et al. |
| 2007/0243626 | A1 | * | 10/2007 | Windeyer .......... G01N 35/0092 422/292 |
| 2008/0248560 | A1 | | 10/2008 | Drummond |
| 2010/0099199 | A1 | | 4/2010 | Egle et al. |
| 2010/0112624 | A1 | | 5/2010 | Metzner et al. |
| 2010/0112625 | A1 | | 5/2010 | Erben et al. |
| 2011/0041599 | A1 | | 2/2011 | Herrmann et al. |
| 2013/0196339 | A1 | | 8/2013 | Dowling et al. |
| 2015/0241325 | A1 | * | 8/2015 | Webber ................. G01N 1/312 221/307 |
| 2016/0175173 | A1 | * | 6/2016 | Higgs-Jackson ...... B65D 25/14 29/434 |
| 2019/0137532 | A1 | | 5/2019 | Temple et al. |

FOREIGN PATENT DOCUMENTS

| | | |
|---|---|---|
| JP | 2000028501 A | 1/2000 |
| JP | 2016035386 A | 3/2016 |
| WO | 03029845 A2 | 4/2003 |
| WO | 2005031312 A1 | 4/2005 |
| WO | 2005116609 A1 | 12/2005 |

OTHER PUBLICATIONS

Haeckel et al., "Recommendations for definition and determination of carry-over effects", Journal of Automatic Chemistry, vol. 10, No. 4, pp. 181-183, Oct. 1988, XP055767785 (4 pages total).
International Preliminary Report on Patentability with translation of Written Opinion dated Feb. 25, 2020, in International Application No. PCT/AU2018/050892.
International Search Report dated Oct. 29, 2018 in International Application No. PCT/AU2018/050892.
International Search Report for PCT/AU2018/050892, dated Oct. 29, 2018.
Written Opinion for PCT/AU2018/050892, dated Oct. 29, 2018.
Mettler-Toledo International Inc. all rights reserved. (Jul. 31, 2017). Mettler toledo balances & scales for Industry, Lab, Retail. Mettler Toledo Balances & Scales for Industry, Lab, Retail— Mettler Toledo, https://web.archive.org/web/20170808205100/https://www.mt.com/us/en/home.html. (Year: 2017).
European Exam Report Article dated Nov. 16, 2022, in EP Application No. 18849016.3.
Japanese Office Action dated Aug. 9, 2022 in JP Application No. 2020-505829.
Chinese Office Action dated Nov. 3, 2022 in Chinese Application No. 201880045954.0.
Indian Office Action dated Mar. 25, 2022, in Indian Application No. 201917051291.
Office Action dated Jan. 17, 2023 issued by the Japanese Patent Office in Japanese Application No. 2020-505829.
Office Action issued Jul. 17, 2023 in Canadian Application No. 3,066,282.
Office Action issued Apr. 28, 2023 in Korean Application No. 10-2020-7001883.
Office Action issued May 24, 2023 in Australian Application No. 2018322484.
Communication issued Oct. 20, 2023 in European Application No. 18 849 016.3.
Australian Examination Report No. 1 for Australian Patent Application No. 2023270360, dated Sep. 6, 2024, 2 pages.
Communication pursuant to Article 94(3) EPC for European Patent Application No. 18849016.3, dated Dec. 19, 2024, 6 pages.
Extended European Search Report for European Patent Application No. 25169488.1, dated Jul. 10, 2025, 6 pages.

* cited by examiner

HISTOLOGICAL TISSUE SPECIMEN PROCESSING

This application is a continuation of U.S. application Ser. No. 16/621,362, filed Dec. 11, 2019, which is a National Stage of International Application No. PCT/AU2018/050892 filed Aug. 22, 2018. claiming priority based on U.S. Provisional Patent Application No. 62/548,638 filed on 22 Aug. 2017, the contents of which are to be taken as incorporated herein by this reference.

TECHNICAL FIELD

The present invention relates to a method of operating a tissue processor, and to the tissue processor. The tissue processor includes at least one retort for receiving tissue samples, and at least one container for storing a reagent. It relates more particularly but not exclusively to operating the tissue processor to determine whether a reagent is suitable for processing tissue samples in the tissue processor. The present invention also relates to a container for storing tissue samples for processing in a tissue processor.

BACKGROUND OF INVENTION

Biological tissue samples, in particular histological tissue samples, are often required in the fields of human and veterinary medicine, in particular as microscopic prepared specimens for the assessment of cells and their environment. For microscopic inspection, thin sections of the tissue sample must be prepared for assessment under the microscope, in incident or transmitted light, by an expert.

The production of thin sections, for example using a microtome, requires that the tissue sample have a certain strength so that thin, transparent sections having a thickness on the order of micrometres can be produced using a knife. For this purpose, the tissue sample must first pass through a treatment process in which it is fixed, dehydrated, cleared, and then infiltrated with a carrier material, preferably melted paraffin. These processes are often performed successively in a single unit called a "tissue processor"; this tissue processor includes for this purpose a closable process chamber called a "retort" that receives the various reagents, in particular process media, for carrying out the process steps at a suitable temperature and pressure.

These processes for processing the tissue samples in the tissue processor are generally provided as a tissue processor workflow. The tissue processor workflow defines the processes to be applied by selected laboratory stations in the tissue processor, such as the retort. Also, where the tissue sample is to be analysed for histopathological or histological assessment, the tissue processor workflow forms part of a histopathology workflow.

Successful processing of tissue samples using a tissue processor relies on immersing the tissue samples in reagents at temperature or ambient temperature in a sequence of reagent types and increasing concentrations. Processing of tissue samples with reagent of insufficient concentration before progressing to the next reagent type can result in contamination of the sample and poorly processed tissue. In worst case scenarios, the processed tissue cannot be used for diagnostic purposes resulting in patients requiring re-biopsy or where in instances when there is no more sample to excise, such as for melanomas, a failure to diagnose the biopsy.

The reagent quality is dependent on a user to ensure that a sufficient concentration of reagent is provided in the tissue processor and that the concentration is accurately identified, which is susceptible to human error. For example, a user may inadvertently assume that a reagent is pure although dilution or contamination of the reagent has occurred during processing. Furthermore, a user may incorrectly re-fill a reagent container of the tissue processor with the incorrect reagent type, concentration or volume. Additionally, a user may replace an empty or partially full reagent container in the tissue processor to activate a sensor and overcome a system error of insufficient reagent for processing.

Therefore, it would be desirable to provide a method of operating a tissue processor, and a tissue processor, that can verify reagent quality so as to avoid user error and potential suboptimal tissue processing, and which ameliorates and/or overcomes one or more problems or inconveniences of the prior art.

Successful processing of tissue samples using a tissue processor also relies on design of the basket which is loaded into the tissue processor and stores the tissue samples for processing, preferably within cassettes. The basket design is important to ensure that the reagents used in tissue processing flow to the cassettes and tissue samples to achieve optimal processing. However, baskets currently used in tissue processors can interfere with sensors for determining fluid level in the retort in which the basket is placed. This may result in incorrect volumes or types of processing fluid being used in tissue processing protocols, which may lead to poorly processed tissue samples. Furthermore, multiple baskets are usually stacked in the retort for efficient processing and/or are transported in a stacked configuration from grossing, where formalin soaked samples are prepared, to tissue processing stations of the tissue processor. However, the baskets currently used in tissue processors include a handle that may interfere with their stacking for these purposes.

Therefore, it would also be desirable to provide a basket for a tissue processor that does not interfere with fluid sensors of the tissue processor and/or is able to be readily stacked, and which ameliorates and/or overcomes one or more problems or inconveniences of the prior art.

A reference herein to a patent document or any other matter identified as prior art, is not to be taken as an admission that the document or other matter was known or that the information it contains was part of the common general knowledge as at the priority date of any of the claims.

SUMMARY OF INVENTION

Viewed from one aspect of the present invention, there is provided a method of operating a tissue processor for processing tissue samples, the tissue processor including: at least one retort for receiving tissue samples; at least one container for storing a reagent; and at least one sensor arranged for fluid communication with one or both of the at least one container and the at least one retort for measuring a measured purity level of a reagent, the method including the steps of: a) conducting reagent from the at least one container or the at least one retort to the at least one sensor; b) automatically measuring, by means of the at least one sensor, a measured purity level of the reagent; c) checking whether the measured purity level meets a predetermined purity level of the reagent associated with the at least one container; and d) automatically determining, based on a result of the checking, whether the reagent is suitable for processing tissue samples in the tissue processor.

In some embodiments, the method further includes the step of providing the predetermined purity level of the reagent based on reagent data for the at least one container. The reagent data preferably includes at least a concentration value of the reagent. The concentration value can be a percentage dilution of the reagent in water, such as 70%, 80% or 100%. The reagent data can also include one or more of a reagent type, a reagent name and a container number. The reagent type can include one or more of a dehydrating fluid, such as ethanol, methanol, isopropanol, butanol, ethylene glycol and various alcohols, a clearing reagent, such as xylene, di-pentene, D-limonene, 1,1,1, trichloroethane, toluene and dioxane, and an infiltrating material, such as paraffin wax, to name a few.

The method can further include the step of receiving, at the tissue processor, the reagent data for the at least one container from a user. The tissue processor can further include an input device, and the receiving step can include receiving the reagent data by means of the input device. The input device can include a control interface of the tissue processor having, for example, a touchscreen display operable by a user. Additionally/alternatively, the tissue processor can include a controller configured to receive the reagent data from a server or computing system, such as through a wireless or hard-wired connection.

The predetermined purity level of the reagent can be one of a threshold value or a tolerance range of values. Preferably, the predetermined purity level of the reagent is a concentration level determined based on the concentration value from the reagent data. The concentration level can be a threshold value, where the threshold value can be the concentration value from the reagent data. Where the concentration level is a tolerance range of values, the range can be determined based on the concentration value from the reagent data.

Alternatively, the predetermined purity level can be a density level determined based on the concentration value from the reagent data. The density level can be a threshold value, where the threshold value can be a density value derived from the concentration value from the reagent data, such as through a calculation based on the pure reagent concentration or using a look-up table for the reagent. Where the density level is a tolerance range of values, the range can be determined based on the derived density value.

In some embodiments, the at least one sensor measures at step b) a density value that represents the measured purity level of the reagent. The at least one sensor is preferably a fluid sensor configured to measure the density value of the reagent. The fluid sensor can be a densitometer, and preferably an oscillating pipe density meter.

The method can further include the steps of repeating the measuring step b) one or more times, and calculating an average of the measured density values, wherein the calculated average represents the measured purity level of the reagent. Preferably, the measuring step b) is repeated at least three times for calculating the average of the three measured density values. The measured purity level is preferably a concentration value derived from the measured density value or the average of the measured density values, such as through a calculation method based on the pure reagent density or using a look-up table for the reagent. Alternatively, the measured purity level can be the measured density value or the average of the measured density values.

In some embodiments, the checking step c) of the method includes checking whether the measured purity level is (i) greater than the threshold value of the predetermined purity level, or (ii) within the tolerance range of values of the predetermined purity level. The checking step is preferably performed on the basis of a comparison of concentration values, where the measured purity level is the concentration value derived from the measured density value or average of measured density values, and the predetermined purity level is the concentration value from the reagent data or the tolerance range of values determined based on the concentration value from the reagent data. However, the checking step can be performed on the basis of a comparison of density values, such as when the predetermined purity level is a density level.

In some embodiments, the automatically determining step d) includes: determining that the reagent is suitable for processing tissue samples when the measured purity level is greater than the threshold value or within the tolerance range of values; and determining that the reagent is unsuitable for processing tissue samples when the measured purity level is less than the threshold value or falls outside the tolerance range of values. When the reagent is determined to be unsuitable for processing tissue samples, the method can further include the step of flagging the at least one container for non-use by the tissue processor. The method can also further include the step of generating, at the tissue processor, a notification signal for a user to check the reagent in the flagged container. The notification signal can be provided to the user by the input device, such as a control interface having a user display. The notification signal can include a message and/or alarm displayed on the user display.

The method can be performed prior to operating the tissue processor to perform a tissue processing protocol using the reagent. Accordingly, in some embodiments the tissue processor includes a dedicated line connecting the at least one container or the at least one retort to the at least one sensor, and the conducting step a) of the method includes conducting reagent in the dedicated line from the at least one container or the at least one retort to the at least one sensor. Preferably, the dedicated line is separate from a reagent line that connects the at least one container to the at least one retort. The conducting step a) can include the transfer or pumping of reagent from the at least one container or the at least one retort along the dedicated line to the at least one sensor for measuring the measured purity level of the reagent.

In other embodiments, the method is performed when operating the tissue processor to perform a tissue processing protocol using the reagent. The tissue processor can include a reagent line connecting the at least one container and the at least one retort, wherein the at least one sensor is arranged for fluid communication with the reagent line, and wherein the conducting step a) includes conducting reagent in the reagent line between the at least one container and the at least one retort. The at least one sensor can be one of: positioned in the reagent line; or positioned in a bypass line that receives a portion of the reagent when the reagent is conducted in the reagent line.

The method can be performed on one or both of: filling of the at least one retort with reagent; and draining of the at least one retort to remove reagent. Accordingly, the method can be performed on starting and/or finishing of a tissue processing protocol during which the at least one retort is filled or drained, respectively. In some embodiments, the method further includes the step of operating the tissue processor to stop filling or draining of the at least one retort to perform at least method steps (b)-(d). The operating the tissue processor to stop filling or draining can include one or both of: operating the tissue processor to stop filling prior to reagent contacting tissue samples stored in the at least one retort; and operating the tissue processor to stop filling prior to reagent being delivered to the at least one container.

When the reagent is determined to be suitable for processing tissue samples, the method can further include the step of operating the tissue processor to continue filling or draining of the at least one retort to complete the tissue processing protocol. Otherwise, when the reagent is determined to be unsuitable for processing tissue samples, the method can further include the step of operating the tissue processor to abandon the tissue processing protocol.

In some embodiments, the tissue processor includes a first container for storing a first reagent and a second container for storing a second reagent. The method can further include the step of: operating the tissue processor to perform a tissue processing protocol using the first reagent and the second reagent; and automatically determining a carry over volume of the first reagent from the first container into the second reagent from the second container.

In some embodiments, the step of automatically determining the carry over volume includes the steps of: providing an initial volume of the second reagent in the second container; and performing the measuring step b) to measure the following: a density value of the first reagent on draining of the at least one retort; a density value of the second reagent on filling of the at least one retort; and a density value of the second reagent on draining of the at least one retort, wherein the carry over volume is calculated according to:

$$V_{CO} = \frac{\rho_{C2_{out}} - \rho_{C2_{in}}}{\rho_{C1_{out}} - \rho_{C2_{out}}} \times V$$

wherein: $V_{CO}$=volume of carry over (L), $\rho_{C2_{out}}$=measured density value of the second reagent on draining of the at least one retort (kg/m$^3$), $\rho_{C2_{in}}$=measured density value of the second reagent on filling of the at least one retort (kg/m$^3$), $\rho_{C1_{out}}$=measured density value of the first reagent on draining of the at least one retort (kg/m$^3$), and V=initial volume of the second reagent in the second container (L).

Viewed from another aspect of the present invention, there is provided a computer program product including: a computer readable medium having computer readable program code and computer readable system code embodied on the medium for, operating a tissue processor, within a data processing system, the computer program product including: computer readable code within the computer readable medium for performing the method of operating a tissue processor as described above.

Viewed from another aspect of the present invention, there is provided a tissue processor for processing tissue samples, including: at least one retort for receiving tissue samples; at least one container for storing a reagent; at least one sensor arranged for fluid communication with one or both of the at least one container and the at least one retort for measuring a measured purity level of a reagent; and a controller configured to: conduct reagent from the at least one container or the at least one retort to the at least one sensor; measure, by means of the at least one sensor, a measured purity level of the reagent; check whether the measured purity level meets a predetermined purity level of the reagent associated with the at least one container; and determine, based on a result of the checking, whether the reagent is suitable for processing tissue samples in the tissue processor.

In some embodiments, the controller is further configured to provide the predetermined purity level of the reagent based on reagent data for the at least one container. The reagent data preferably includes at least a concentration value of the reagent. The concentration value can be a percentage dilution of the reagent in water, such as 70%, 80% or 100%. The reagent data can also include one or more of a reagent type, a reagent name and a container number. The reagent type can include one or more of a dehydrating fluid, such as ethanol, methanol, isopropanol butanol, ethylene glycol and various alcohols, a clearing reagent, such as xylene, di-pentene, D-limonene, 1,1,1, trichloroethane, toluene and dioxane, and an infiltrating material, such as paraffin wax, to name a few.

The controller can be further configured to receive, at the tissue processor, the reagent data for the at least one container from a user. The tissue processor can further include an input device, and the controller can be configured to receive the reagent data by means of the input device. The input device can include a control interface of the controller having, for example, a touchscreen display operable by a user. Alternatively, the controller can be configured to receive the reagent data from a server or computing system, such as through a wireless or hard-wired connection.

The predetermined purity level of the reagent can be one of a threshold value or a tolerance range of values. Preferably, the predetermined purity level of the reagent is a concentration level determined based on the concentration value from the reagent data. The concentration level can be a threshold value, where the threshold value can be the concentration value from the reagent data. Where the concentration level is a tolerance range of values, the range can be determined based on the concentration value from the reagent data.

Alternatively, the predetermined purity level can be a density level determined based on the concentration value from the reagent data. The density level can be a threshold value, where the threshold value can be a density value derived from the concentration value from the reagent data, such as through a calculation based on the pure reagent concentration or using a look-up table for the reagent. Where the density level is a tolerance range of values, the range can be determined based on the derived density value.

In some embodiments, the at least one sensor measures a density value that represents the measured purity level of the reagent. The at least one sensor is preferably a fluid sensor configured to measure the density value of the reagent. The fluid sensor can be a densitometer, and preferably an oscillating pipe density meter.

The controller can be configured to measure, by means of the at least one sensor, the density value that represents the measured purity level of the reagent two or more times, and can be further configured to calculate an average of the measured density values, wherein the calculated average represents the measured purity level of the reagent. Preferably, the density value is measured at least three times for calculating the average of the three measured density values. Preferably, the measured purity level is a concentration value derived from the measured density value or the average of the measured density values, such as through a calculation method based on the pure reagent density or using a look-up table for the reagent. Alternatively, the measured purity level can be the measured density value or the average of the measured density values.

In some embodiments, the controller checks whether the measured purity level is (i) greater than the threshold value of the predetermined purity level, or (ii) within the tolerance range of values of the predetermined purity level. The checking is preferably performed on the basis of a comparison of concentration values, where the measured purity level is the concentration value derived from the measured density value or average of measured density values, and the predetermined purity level is the concentration value from the reagent data or the tolerance range of values determined based on the concentration value from the reagent data. However, the checking step can be performed on the basis of a comparison of density values, such as when the predetermined purity level is a density level.

In some embodiments, the controller determines that the reagent is suitable for processing tissue samples when the measured purity level is greater than the threshold value or within the range of values; and wherein the controller determines that the reagent is unsuitable for processing tissue samples when the measured purity level is less than the threshold value or falls outside the range of values. When the reagent is determined to be unsuitable for processing tissue samples, the controller can be further configured to flag the at least one container for non-use by the tissue processor. The controller can also be further configured to generate, at the tissue processor, a notification signal for a user to check the reagent in the flagged container. The notification signal can be provided to the user by the input device, such as a control interface of the controller having a user display. The notification signal can include a message and/or alarm displayed on user display.

The controller can determine whether the reagent is suitable for processing tissue samples prior to operating the tissue processor to perform a tissue processing protocol using the reagent. Accordingly, in some embodiments the tissue processor includes a dedicated line connecting the at least one container or the at least one retort to the at least one sensor, and the controller conducts reagent in the dedicated line from the at least one container or the at least one retort to the at least one sensor. Preferably, the dedicated line is separate from a reagent line that connects the at least one container to the at least one retort. Conducting reagent can include the transfer or pumping of reagent from the at least one container or the at least one retort along the dedicated line to the at least one sensor for measuring the measured purity level of the reagent.

In other embodiments, the controller determines whether the reagent is suitable for processing tissue samples when operating the tissue processor to perform a tissue processing protocol using the reagent. The tissue processor can include a reagent line connecting the at least one container and the at least one retort, wherein the at least one sensor is arranged for fluid communication with the reagent line, and wherein the controller conducts reagent in the reagent line between the at least one container and the at least one retort. The at least one sensor can be one of: positioned in the reagent line; or positioned in a bypass line that receives a portion of the reagent when the reagent is conducted in the reagent line.

The controller can determine whether the reagent is suitable for processing tissue samples during one or both of: filling of the at least one retort with reagent; and draining of the at least one retort to remove reagent. Accordingly, the controller can determine the suitability of the reagent on starting and/or finishing of a tissue processing protocol during which the at least one retort is filled or drained, respectively. In some embodiments, the controller is further configured to operate the tissue processor to stop filling or draining of the at least one retort to determine whether the reagent is suitable for processing tissue samples. The controller can operate the tissue processor to stop filling or draining by one or both of: operating the tissue processor to stop filling prior to reagent contacting tissue samples stored in the at least one retort; and operating the tissue processor to stop filling prior to reagent being delivered to the at least one container.

When the controller determines that the reagent is suitable for processing tissue samples, the controller can be further configured to operate the tissue processor to continue filling or draining of the at least one retort to complete the tissue processing protocol. Otherwise, when the controller determines that the reagent is unsuitable for processing tissue samples, the controller can be further configured to operate the tissue processor to abandon the tissue processing protocol.

In some embodiments, the tissue processor includes a first container for storing a first reagent and a second container for storing a second reagent. The controller can be further configured to: operate the tissue processor to perform a tissue processing protocol using the first reagent and the second reagent; and determine a carry over volume of the first reagent from the first container into the second reagent from the second container.

In some embodiments, the controller is configured to determine the carry over volume by: receiving an initial volume of the second reagent in the second container; and measuring, by means of the at least one sensor, the following: a density value of the first reagent on draining of the at least one retort; a density value of the second reagent on filling of the at least one retort; and a density value of the second reagent on draining of the at least one retort, wherein the controller calculates the carry over volume according to:

$$V_{CO} = \frac{\rho_{C2_{out}} - \rho_{C2_{in}}}{\rho_{C1_{out}} - \rho_{C2_{out}}} \times V$$

wherein: $V_{CO}$=volume of carry over (L), $\rho_{C2_{out}}$=measured density value of the second reagent on draining of the at least one retort (kg/m$^3$), $\rho_{C2_{in}}$=measured density value of the second reagent on filling of the at least one retort (kg/m$^3$), $\rho_{C1_{out}}$=measured density value of the first reagent on draining of the at least one retort (kg/m$^3$), and V=initial volume of the second reagent in the second container (L).

Viewed from another aspect of the present invention, there is provided a container for storing tissue samples for processing in a tissue processor, wherein the container is configured to be accommodated in a retort of the tissue processor and provide access to the stored tissue samples for processing with a process fluid in the retort, wherein the retort includes at least one sensor for detecting a level of the process fluid in the retort, and wherein the container is configured to minimise interference with the at least one sensor.

In some embodiments, the container is a basket for storing the tissue samples. In some embodiments, the at least one sensor is an optical sensor, and the container includes at least one non-reflective surface for minimising interference with the optical sensor. Preferably, the at least one non-reflective surface includes an opaque material. The opaque material ideally minimises reflections that can occur during use of the optical sensor to detect the level of the process fluid.

The container can be configured to releasably receive one or more clips having the at least one non-reflective surface. For example, the container can be a basket and the one or more clips can be releasably attached to openings in side portions of the basket. Additionally/alternatively, the container can include side portions having the at least one non-reflective surface.

Viewed from another aspect of the present invention, there is provided a container for storing tissue samples for processing in a tissue processor, wherein the container is configured to be accommodated in a retort of the tissue processor and provide access to the stored tissue samples for processing with a process fluid in the retort, wherein the container includes a retractable handle to facilitate stacking of a plurality of the containers.

In some embodiments, the container is a basket for storing the tissue samples. In some embodiments, the container further includes a receptacle having a central recess for receiving the handle in a retracted position. The handle is preferably integral with the receptacle. Integrating the handle into the receptacle can avoid any dependency on secure attachment of a lid, thereby reducing the risk of dropping the container during transport.

The container can further include a lid having a slot through which the handle is extendable to an extended position. Ideally, the handle does not protrude or only partly protrudes through the slot of the lid in the retracted position. In some embodiments, the receptacle includes a base portion having a slot for receiving at least part of a handle of a corresponding container. The slot in the base portion can receive a partly protruded handle of a corresponding container for ease of stacking.

Viewed from yet another aspect of the present invention, there is provided the tissue processor as described above and further including the container for storing tissue samples as described above.

BRIEF DESCRIPTION OF DRAWINGS

The invention will now be described in greater detail with reference to the accompanying drawings in which like features are represented by like numerals. It is to be understood that the embodiments shown are examples only and are not to be taken as limiting the scope of the invention as defined in the claims appended hereto.

DETAILED DESCRIPTION

Embodiments of the invention are discussed herein by reference to the drawings which are not to scale and are intended merely to assist with explanation of the invention. The inventive method, tissue processor and computer program product have utility in the operation of a tissue processor for processing tissue samples for histological analysis. The inventive method, tissue processor and computer program product have particular utility in the operation of a tissue processor to determine whether a reagent is suitable for processing tissue samples in the tissue processor, either prior to or during operation of the tissue processor to perform a tissue processing protocol using the reagent. Furthermore, the inventive container for storing tissue samples has utility in minimising interference with fluid sensors of a tissue processor and/or is able to be readily stacked for ease of use.

A prior art tissue processor 10 is described in International PCT Application No. PCT/AU02/01337, publication No. WO 03/029845, titled "Histological Tissue Specimen Treatment", published 10 Apr. 2003 and filed by Vision Biosystems Limited. The tissue processor 100 of preferred embodiments of the invention includes similar components to the prior art tissue processor 10 disclosed in WO 03/029845 and, therefore, it will be convenient to hereinafter describe the prior art tissue processor 10 disclosed in that application. It should be appreciated, however, that embodiments of the invention are not limited to having identical components or all of the components of the prior art tissue processor 10 disclosed in WO 03/029845 and as described herein. For example, embodiments of the invention may be directed to tissue processors or methods of operating tissue processors that differ from the prior art tissue processor 10 and that only comprise a single retort, as will be described herein.

Description of Histological Tissue Processor

Figure 1:
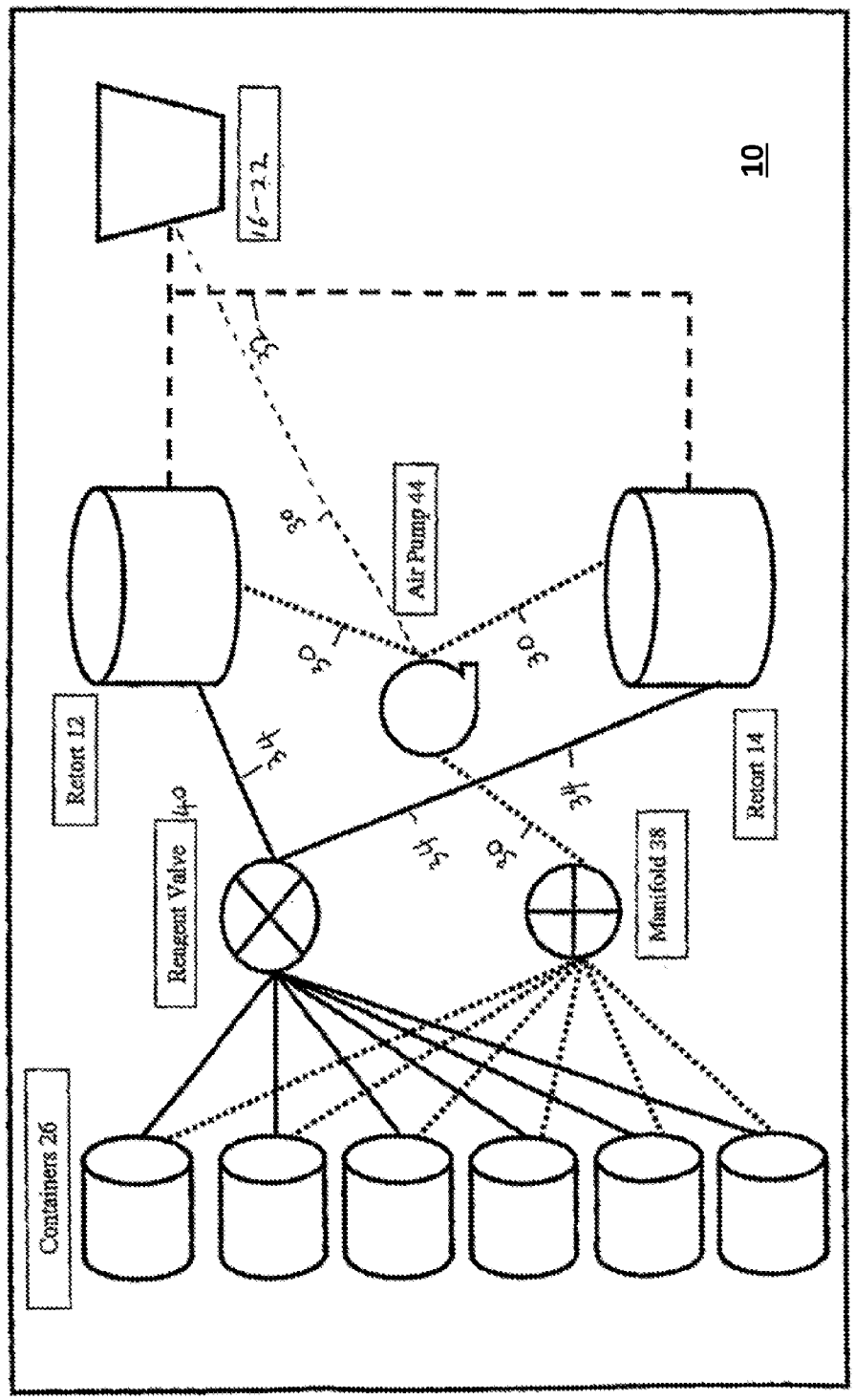
FIG. 1 is a simplified schematic block diagram of a prior rt tissue processor showing the basic elements thereof.

In FIG. 1 an example of a general schematic of a prior art tissue processor 10 is shown, indicating major features such as retorts 12 and 14, four infiltrating baths 16-22, containers 26, reagent valve 40, manifold 38, and air pump 44. There are three main fluid sub-systems connecting the major elements, one sub-system being the air lines 30 from pump 44 to infiltrating baths 16-22 and retorts 12 and 14. A second sub-system being infiltrating, lines 32 connects infiltrating, baths 16-22 to the retorts 12 and 14. A third sub-system is reagent lines 34 connecting the containers 26 to the reagent valve 40 and the retorts 12 and 14. Valving as shown in FIG.

Figure 2:
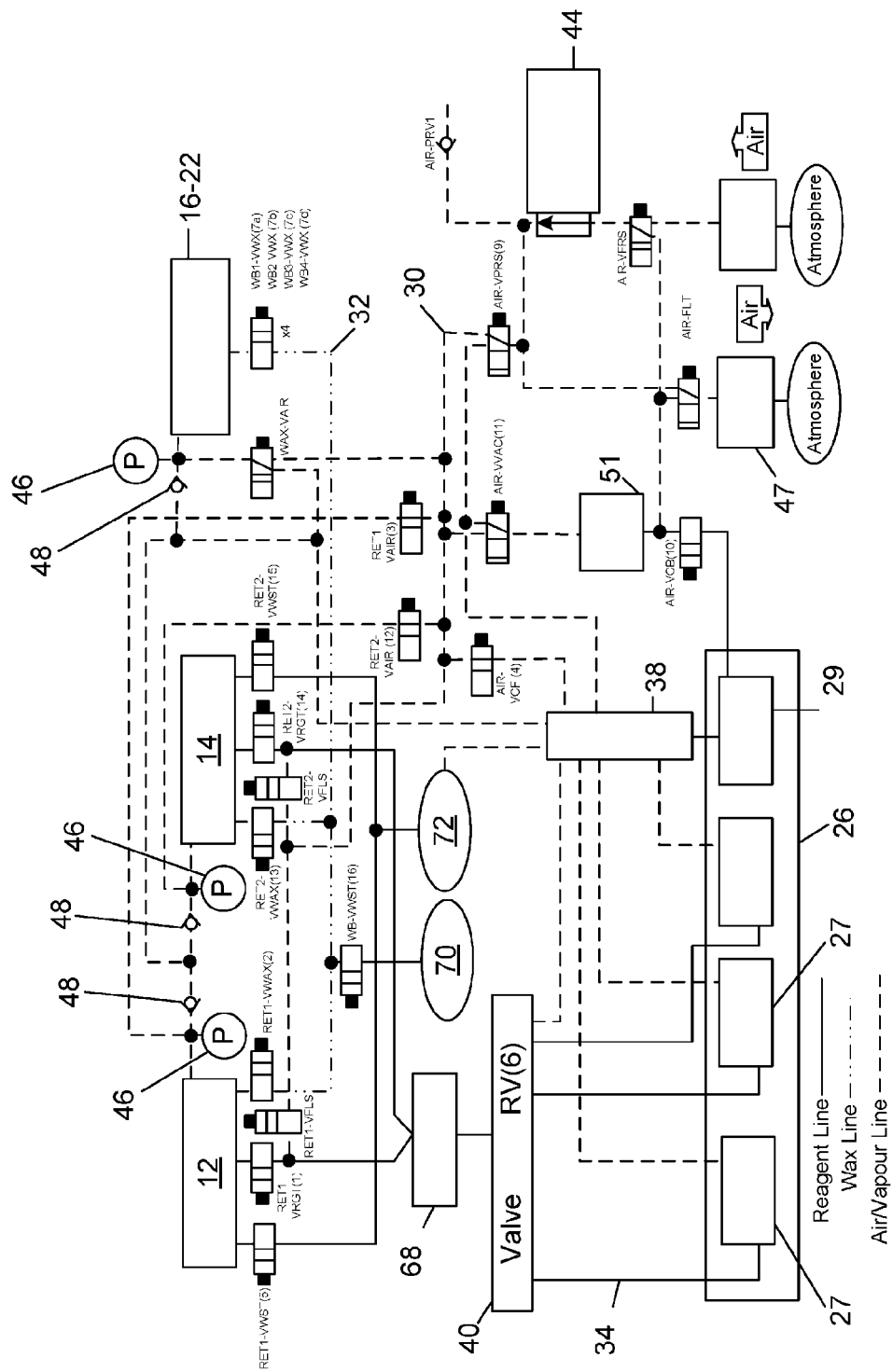
FIG. 2 is a detailed schematic block diagram of the prior art tissue processor of FIG. 1 showing air and reagent lines.

2 ensures that fluid flows along the lines to the correct destination, and FIG. 2 shows a specific embodiment of fluid line connection and valve placement relative to the aforementioned elements. The electrical connections between the controller 25, valves, pump 44 and other elements have been omitted from FIG. 2 for clarity, and are considered standard fittings. Also omitted from FIG. 2 are the numerous containers 26 (see for example, containers 27 and 29 of FIG. 2) and their respective connections to the reagent valve 40, to provide clarity. The omitted connections are identical to the connections shown in FIG. 2.

Figure 3:
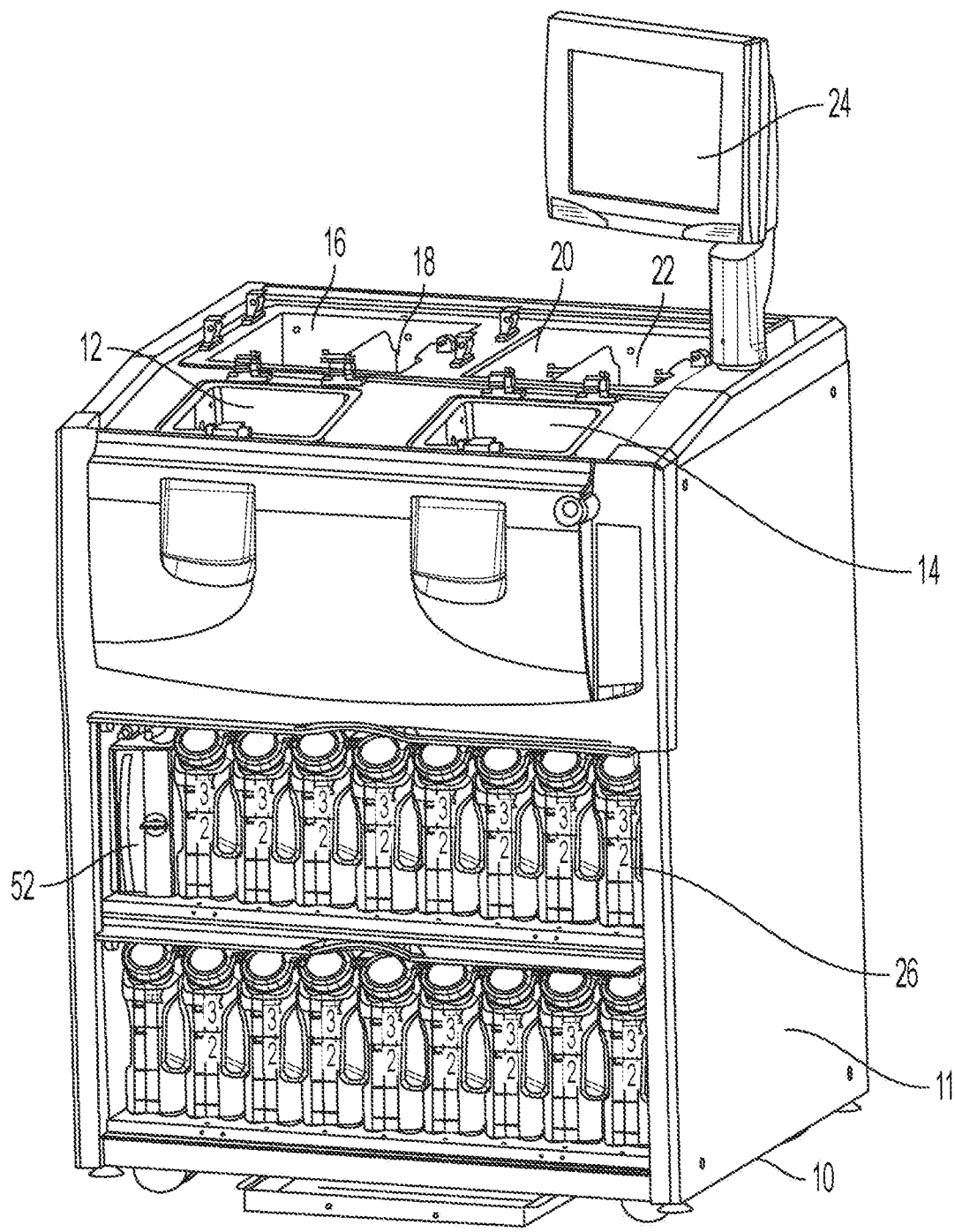
FIG. 3 illustrates a perspective view of the prior art tissue processor of FIGS. 1 and 2.
Figure 8:
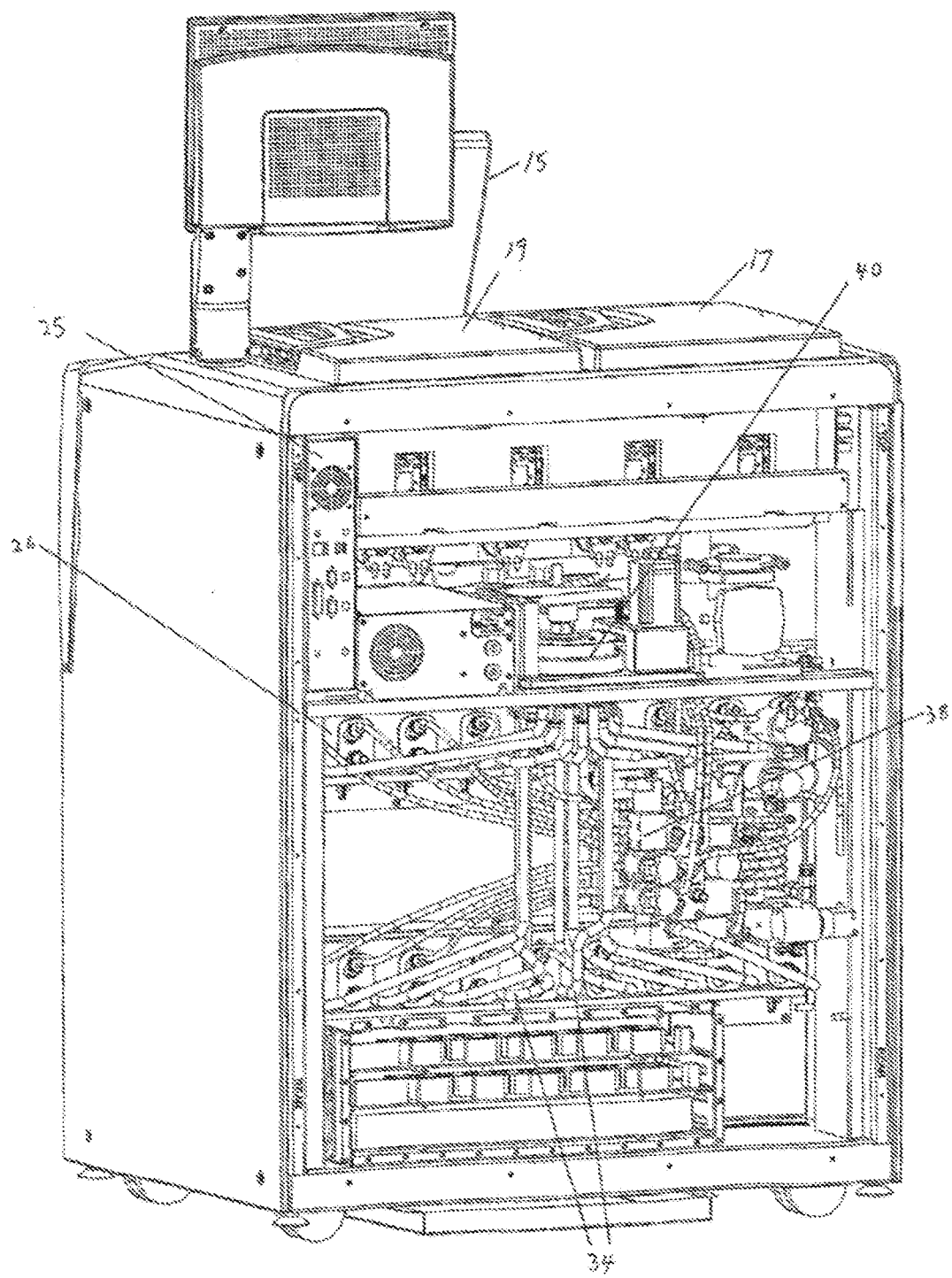
FIG. 8 illustrates a rear view of the tissue processor shown in FIG. 3.

The schematic of FIG. 2 is embodied in the examples shown in FIGS. 3 and 8. With reference to FIGS. 3 and 8, the prior art tissue processor 10 includes control interface 24 that employs a graphical user interface to enable a user to operate the prior art tissue processor 10 by controller 25. In the present embodiment, the controller 25 is located in cabinet 11, however the interface 24 and controller 25 may be located separately, for example as part of a stand-alone personal computer. The controller 25 may include a personal computer processor such as a Celeron chip by Intel Corporation located on an ETX form factor PCB (not shown). The controller 25 may contain or store a number of predefined protocols (or steps) for processing tissue, the protocols being stored in a non-volatile memory such as a hard drive. Protocols may be programmable by the user to implement a number of steps for tissue processing, or they may be predefined. Typical protocol parameters include which reagents are to be applied to the samples, how long the reagents are to be applied, the temperature at which the reagents are applied, whether agitation is to take place, and whether ambient pressure in the retort is to be changed.

In FIG. 3, the retorts 12 and 14 can be seen in front of infiltrating baths 16-22. The lids for the retorts 12 and 14 have been removed for clarity, as have the lids for the infiltrating baths 16-22. An open lid 15 of retort 14 is shown, for example, in FIG. 8. In the present embodiment, each retort 12 and 14 would have a lid (not shown), and each pair of infiltrating baths would also have a lid 17 and 19 (shown in FIG. 8). The lids may seal with the retorts 12 and 14 and baths 16-22 when in a closed position. The containers 26 may be located under the retorts 12 and 14 so as to be accessible to a user. The controller interface 24 in FIGS. 3 and 8 employs a touch screen, however other input and display devices may be employed. Also located under the retorts 12 and 14 is a filter unit 52, which typically includes a carbon filter to absorb vapours from air expelled from the processor 10.

In FIG. 8, the various fluid lines such as reagent lines 34 from reagent containers 26 can be seen attached to a reagent valve 40. The reagent valve 40 may have inputs from all containers 26, and a single output to retorts 12 and 14. A number of air lines can also be seen connecting manifold 38 to the reagent bottles 26. The connections between various elements in FIG. 8 are shown schematically in FIG. 2.

Figure 4:
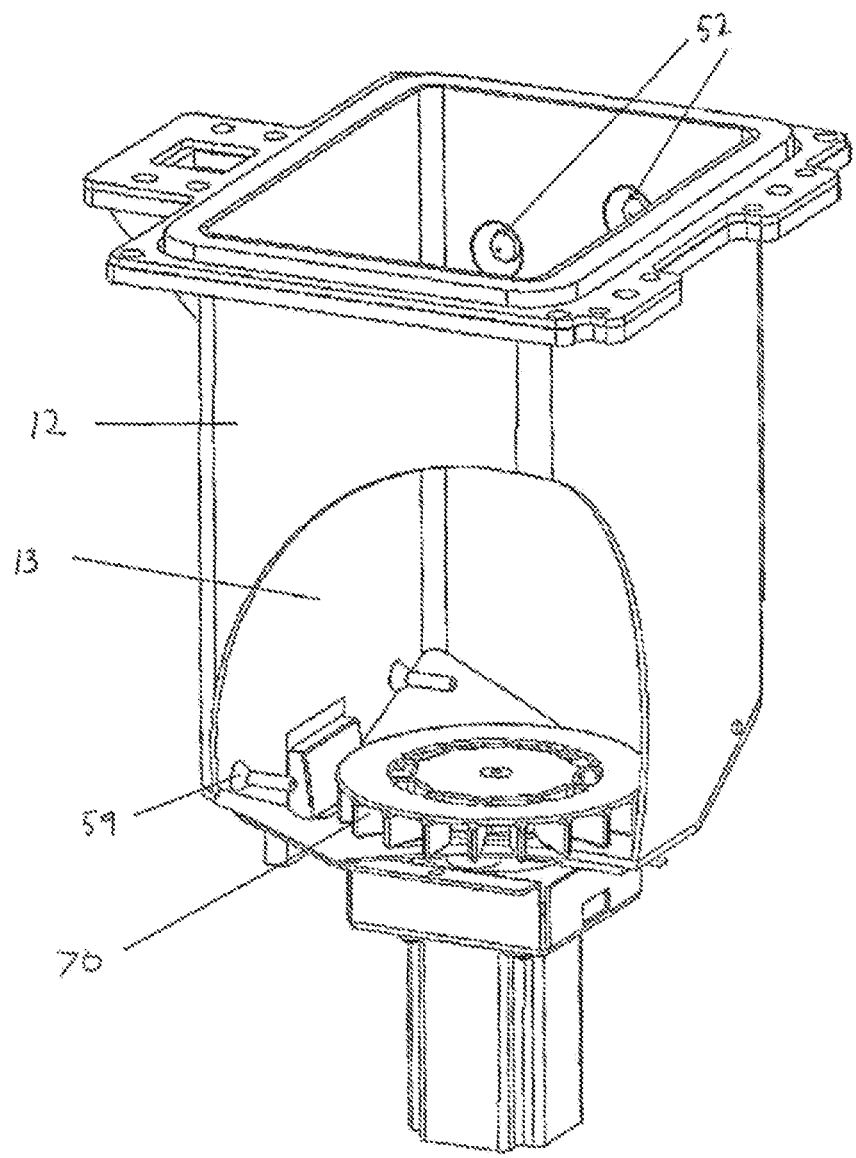
FIG. 4 illustrates a perspective cut-away view of a retort of the prior art tissue processor shown in FIG. 3.
Figure 5:
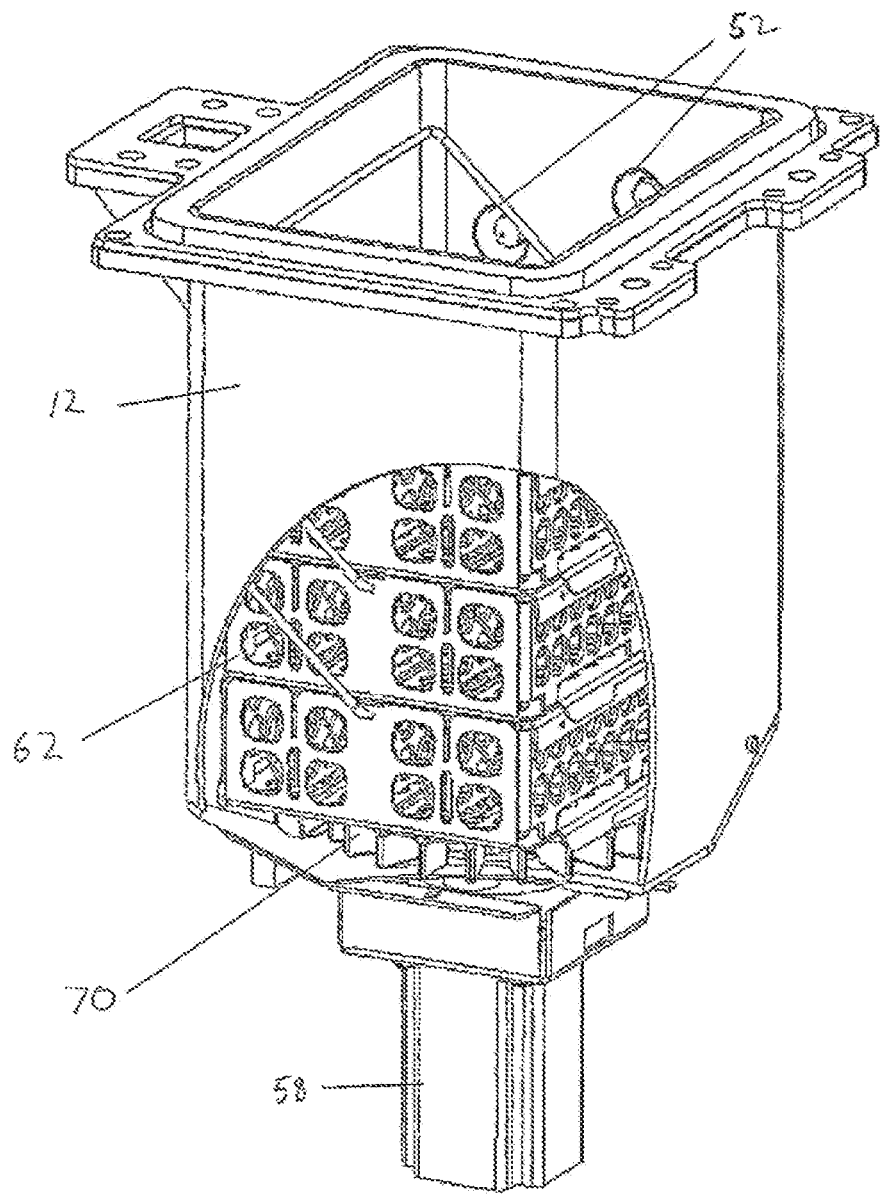
FIG. 5 illustrates a similar perspective cut-away view of the retort of FIG. 4 with cassette baskets in place.
Figure 6:
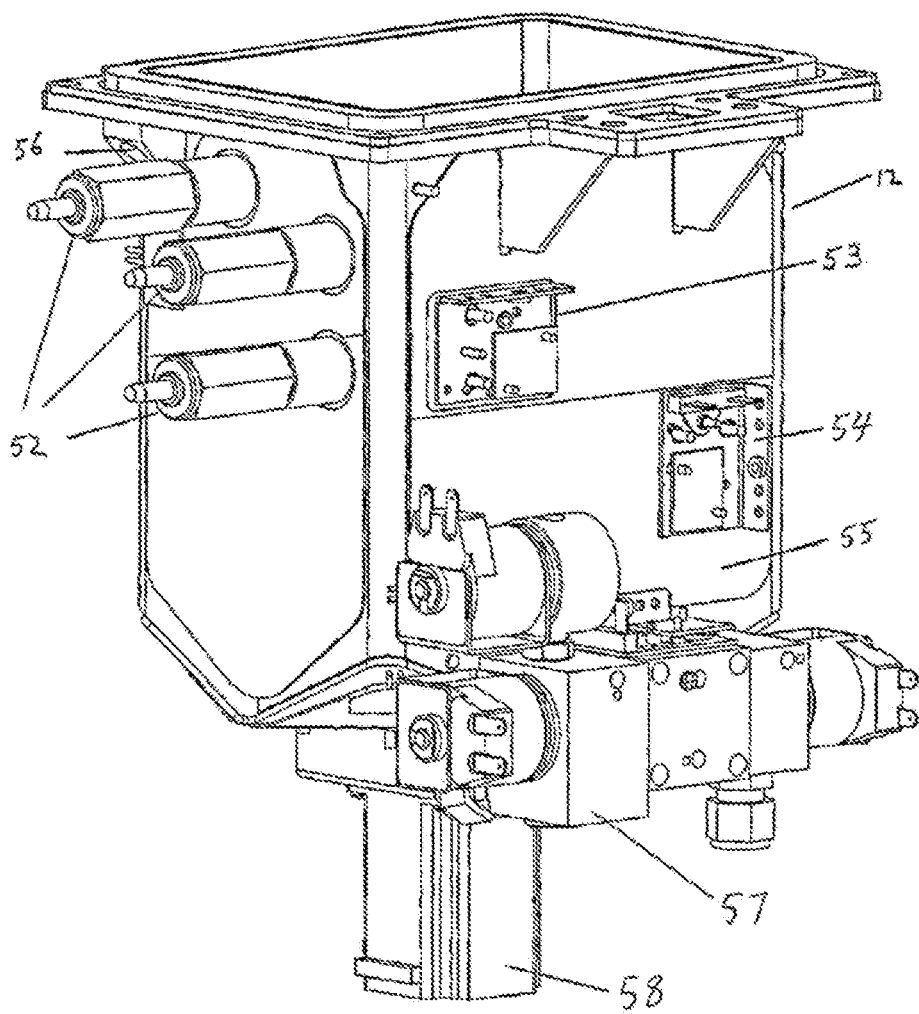
FIG. 6 illustrates a front view of the retort shown in FIG. 4.

One embodiment of retort 12 is shown in FIGS. 4-6, including a receptacle 13 for receiving baskets 62 containing tissue samples. The receptacle 13 has a working capacity of 5.5 litres, however it may not necessarily be completely filled during each step of a protocol. When located in the processor 10, the retort 12 may be rotated 10 degrees forward towards the front of the processor 10. This allows easier access to the baskets 62, as well as providing a drainage point, which is lowermost in the receptacle 13, minimising residuals remaining in the retort 12 after draining.

Sensors 52 are used to detect the level of fluid within the retort 12, so that the controller 25 can ascertain when to turn the pump 44 on or off, or open and close the appropriate valves, as described below. In FIG. 6, the placement of the three sensors 52 can be seen. The lowermost sensor 52 detects when the level of liquid, for example reagent or infiltrating fluid, is above a minimum level. The minimum level may represent a partially filled receptacle 13, which is desirable when operating in economy mode. This is desirable when two or less baskets 62 are to be processed at once, whereupon only approximately 3.8 litres of fluid are required to cover the baskets 62 and samples contained therein. As the baskets may be various sizes, the level of the lowermost sensor 52 and therefore fill volume for economy mode can vary in different embodiments of the retort 12. The middle sensor 52 detects when the level of liquid typically covers three baskets 62, which is a normal full load. The top sensor 52 detects an overfill situation. In this particular embodiment, the sensors 52 are optically based relying on a change in refractive index when liquid comes into contact with a prism (not shown) of the sensor 52. Each basket 62 may hold approximately 100 samples either in individual cassettes or placed directly into the basket 62. Thus a full load for the embodiment of the retort 12 shown in FIGS. 4-6 is approximately 300 samples. The retorts 12 and 14 may be made larger or smaller depending on requirements.

Also shown in FIG. 6 is a temperature sensor 53, which is mounted directly to the retort 12, and the temperature sensor 54, which is mounted to a heating mat 55. The retort 12 is heated to ensure correct reagent, or infiltrating fluid temperature. Placing a temperature sensor 53 directly on the retort 12 allows the fluid temperature within to be measured more accurately than by measuring the temperature of the heating mat 55, especially where the fluid used may have low thermal conductivity. The temperature sensor 54 of the heating mat 55 may then be kept at a maximum while the temperature of the retort 12 is below the maximum processing temperature or more precisely, the desired operating temperature of the retort 12, providing, more rapid heating than if only one temperature sensor 54 was employed.

Port 56 shown in FIG. 6 allows connection of an air line 30 to the retort 12. Retort manifold 57 also allows connection of infiltrating line 32 and reagent line 34 through a common entry point (not shown) at the bottom of the receptacle 13. In FIG. 2, retort manifold 57 incorporates valves ret1-*vrgt* and ret1-*vwax*, and is located at the front of the prior art tissue processor 10 so that the lean angle of 10 degrees of the retort 12 causes all fluid to drain towards the common entry point.

In FIGS. 4 and 5, the interior of the receptacle 13 is shown, including agitator 70. Agitator 70 is magnetically coupled to an electric motor 58, and may be driven at a number of speeds dictated by controller 25. The baskets 62 each contain up to 100 tissue samples. The baskets 62 are supported clear of the agitator on posts 59 as shown in FIG. 4.

In the present example, retorts 12 and 14 are of identical construction, size and operation, however one retort may be larger or more volumous than the other. Connections to and from retort 12 are duplicated on retort 14.

In FIG. 2, pressure relief valves 48 are shown in fluid communication with air lines 30, retorts 12 and 14, and the infiltrating baths. Any overpressure in these lines will result in excess air being vented to waste through the manifold 38 and filter 47. The pressure may be measured by pressure sensors 46 as shown in FIG. 2.

A list of valve functions is as follows with reference to FIG. 2:

Valves ret1-*vwst* and ret2-*vwst* connect retorts 12 and 14 to waste container 72, when a waste cycle is required. Only one retort will be emptied at once and therefore these valves only open one at a time. In another embodiment, the valves ret1-*vwst* and ret2-*vwst* may be omitted, and waste container 72 may be directly connected to the reagent valve 40. To drain reagent to waste, the reagent valve 40 connects to the reagent line 34 connected to the waste container 72, and the valve on the retort 12, 14 is opened to drain reagent directly to the waste container 72.

Valves ret1-*vrgt* and ret2-*vrgt* allow reagent flow into and out of their respective retorts during filling and draining of the retort. When draining a retort, these valves are open so that reagent may flow back down the reagent line 34 and back into the same reagent container 26 from whence it came. It can be seen that air valves ret1-*vfls* and ret2-*vfls* connect to the reagent line 34 between the ret1-*vrgt* and ret2-*vrgt* valves. These air valves are used to purge excess reagent from the reagent lines after filling one retort. This is desirable as using reduced pressure to draw fluid into a retort 12, 14 reduces fluid pressure along the whole reagent line 34, and therefore when pressure is restored to the reagent line 34 some reagent may travel up the line of the retort 12, 14 that was not filled. Opening these valves, or opening the valves and pumping air down the air lines into the reagent lines clears excess reagent, preventing or reducing cross contamination.

Valves ret1-*vwax* and ret2-*vwax* connect the retorts 12, 14 to the infiltrating baths 16-22, via infiltrating lines 32 and valves wb1-*vwx* and wb4-*vwx*. Valves ret1-*vwax* opens when infiltrating fluid is to enter or drain from retort 12, and wb1-*vwx* to wb4-*vwx* open one at a time depending on where the infiltrating fluid is being sourced. The infiltrating line 32 between the infiltrating baths 16-22 and retorts 12, 14 is heated to ensure that the infiltrating material does not harden in the lines.

Valves ret1-*vair* and ret2-*vair* are used to control air from the air pump to the retorts. Air may be supplied either at a positive pressure to ambient, or withdrawn from the retorts 12, 14 so that pressure inside one or both retorts 12, 14 is below ambient pressure. These valves determine which retort 12, 14 is in fluid connection with the air pump 44. Also air-*vprs* must be open to allow communication between the pump 44 and the valves, otherwise air is directed toward wax-air valve, connected to the infiltrating baths 16-22.

Figure 7A:
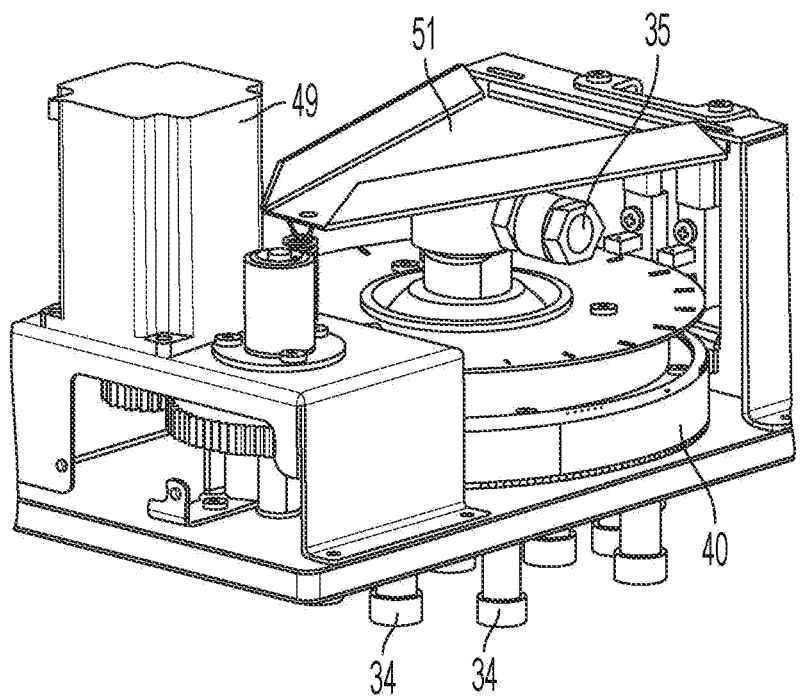
FIGS. 7a and 7b illustrate views of a reagent valve used in the prior art tissue processor of FIGS. 1 to 3.
Figure 7B:
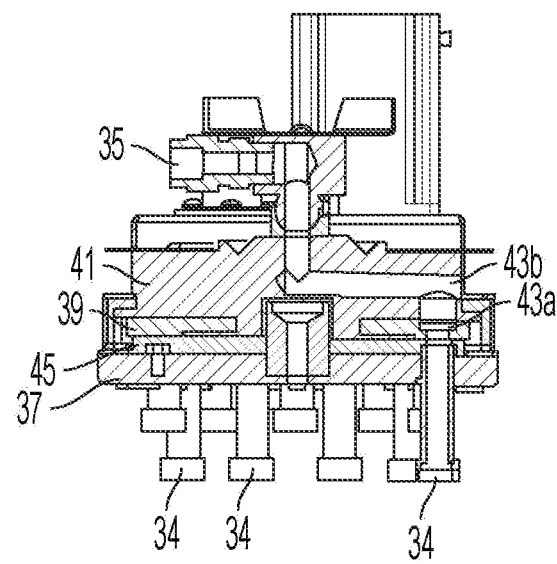

The reagent valve 40 is shown in FIGS. 7*a* and 7*b*, and includes connections between the reagent lines 34 from the reagent containers 26 on the input side, and outlet 35, which is fluidly connected to the retorts 12 and 14. The reagent valve 40 selects which reagent container 26 will be in fluid communication with the reagent line 34 connected to the retorts 12, 14. In the present embodiment, the reagent lines 34 from the reagent containers 26 are arranged in a circle attached to the reagent valve housing 37. In the present embodiment, the reagent valve 40 is in the form of a rotary valve, having two ceramic discs 39 and 41, disc 39 having a single aperture 43*a* aligned with aperture 43*b* to form a conduit for reagent. The discs 39, 41 are mounted coaxially and adjacent each other and rotate together according to the position dictated by the controller 25. Disc 45 has an aperture for each reagent line 34, although in FIG. 7*b* only one aperture is in the plane of the cross section. The rotating discs 39 and 41 rotate with respect to disc 45, driven by stepper motor 49 such that the apertures align to provide a flow path from the outlet 35 (and therefore one retort) to a reagent container 26. In order to assist with sealing between the discs 39, 41 and 45, a plate 51 applies pressure to the discs. In this way, any reagent line 34 and therefore any reagent container 26 can be selected by the controller 25 to be in fluid communication with one of the retorts 12 or 14. This type of valve has a small internal volume and therefore minimises cross contamination. Further, the reagents are drained back into the reagent containers 26 after each step and therefore little reagent remains to contaminate the subsequent reagent. It should be noted that the infiltrating fluid does not pass through the reagent valve 40. This separation of fluid flow prevents the reagent valve 40 from clogging and reduces the amount of cleaning of the valve 40.

In use, the tissue samples to be processed are typically placed into cassettes (not shown) for placement into a basket 62. Generally, tissue samples expected to have similar processing times and to be exposed to the same processing protocol are placed together in the same basket 62. The basket 62 containing the tissue samples is then placed into one of the retorts 12 or 14, and the lid closed, forming a sealed enclosure. An operator may then enter data into the control interface 24 to instruct the controller 25 of the protocol to be followed. The protocol may be programmed step by step, for example indicating the time, temperature, pressure, agitation and reagent for each step, or a pre-programmed protocol encompassing all steps may be selected.

The first step in a protocol, once the lid 17 of the retort 12 is secured, may be to fill the chosen retort (in this example retort 12 is chosen) with a fixing solution. A typical fixing solution is formalin, which may be held in one or more reagent containers 26. In order to fill the retort 12 with fixing solution, the pump 44 is switched on and valves open the air lines from the retort 12 to the inlet side of the pump, pumping air from the retort 12 chamber. The reagent valve 40 is set to a position that fluidly connects the reagent line 34 of the retort 12 to the specified reagent container 26 for formalin. Other valves are opened along the reagent lines 34 from the retort 12 to the reagent valve 40. The reduced pressure in the retort 12 is sufficient to draw fluid out of the reagent container 26, through the reagent valve 40 into the reagent lines 34 and into the retort 12. The retort is heated by heater pads to a predetermined temperature selected and controlled by the controller 25. Sensors 53 and 54 may be used to control the temperature of the retort 12, and therefore the tissue and any reagent contained therein. One or more sensors 52 in the retort as shown in FIGS. 4 and 6, may be used to detect the reagent level. When the reagent level in the retort 12 is sufficient, typically to cover the baskets 62 as seen in FIG. 5, the pump may be turned off or otherwise disengaged from the retort 12, for example by closing valve ret1-*vrgt* shown in FIG. 2.

After a length of time determined by the controller 25 (typically as programmed by the user), the reagent may be removed from the retort 12. This is accomplished by opening valve ret1-*vair* in the air line 30 and opening valve ret1-*vrgt* in the reagent line 34. Reagent will then drain from the retort 12 back into the reagent container 26 from which it came, or back into a different reagent container 26, or to waste, according to the position of the reagent valve 40 determined by the programmed protocol. To assist in draining, the retort 12 may be positively pressurised by air from the pump 44, supplied along the air lines 30. In the present embodiment the reagent drains back to its originating container 26. If the reagent is contaminated, or has been used for the predetermined number of samples or washes, then it is drained to waste using a separate waste cycle.

During the retort filling with reagent from a reagent container 26, the air pumped from the retort 12 flows down an air line 30, some of which flows back through manifold 38 and into the reagent container 26, recirculating some of the air from the retort 12. Excess air pumped from the retort 12 will flow out through a condensing mechanism such as a condensing coil 51, and/or a carbon filter 47, both of which are designed to remove volatile organic or other compounds from the air before it reaches the atmosphere. The processor 10 may have an outlet connection that allows the filtered air to be vented or further filtered by apparatus external to the processor 10.

The second step in tissue processing may be the dehydration step. The methodology employed to draw dehydrating reagent into the retort 12 may be the same as described above, as the dehydrating reagent will be stored in a reagent container 26. The dehydrated fluid may contain a fluid such as an alcohol, for example ethanol. The dehydrating fluid may also contain some water, either intentionally added, or, where the dehydrating fluid has been re-used, water removed from the previous samples. There may be a number of steps of the protocol where dehydrating fluid is applied to the sample in the retort 12, 14, and at each step a different dehydrating fluid may be used. For example, a fluid may be used that has less water than a previous fluid, to draw out more moisture from the sample at each wash. The dehydrating fluid may additionally or alternatively contain isopropanol. Later washes with isopropanol provide properties that may be advantageous, as will be described below. Further additives commonly used in the tissue processor dehydration fluids may be used, as the prior art tissue processor 10 is intended to be compatible with known dehydration fluids.

On a final wash with dehydrating fluid, the fluid is drained completely from the retort 12, 14. This is accomplished by opening valves from the air pump 44 as well as pumping air into the reagent lines 34 to clear the reagent. A vapour flush may be employed where the pump 44 flushes fresh air into the retort 12, 14 to clear any vapour from the reagent, such as a dehydrating fluid. Significant vapour may be present as the dehydrating fluid may have high partial pressure at the retort operating temperature. After the dehydrating step, a drying step may be employed, where the retort 12, 14 is heated by the heating mats 55, while air is pumped through the chamber by the air lines 30. This removes excess dehydrating fluid. The drying step may take several minutes or more, and the retort 12, 14 may be heated to 85 degrees Celsius, depending on the dehydrating fluid chosen and the sensitivity of the tissue samples to heat.

Another step in tissue processing is infiltrating of the samples. This is typically accomplished by an infiltrating material such as a paraffin wax. The wax is held in the infiltrating baths 16-22, which are heated to the desired temperature above the waxes melting temperature, which is typically 54 degrees Celsius. Wax pellets are typically added to an infiltrating bath 16-22, which heats the pellets until they melt and achieve a suitable temperature. Alternatively, pre-molten wax may be added directly to the baths 16-22. The wax is held at the elevated temperature, typically 65 degrees Celsius, until required. The prior art tissue processor 10 shows four infiltrating baths 16-22, however there may be more or less depending on retort and infiltrating bath volume. The infiltrating lines 32 run from the infiltrating baths 16-22 to both retorts 12 and 14, and include valves such as ret1-*vwax* and ret2-*vwax*, that allow one, some, or all baths 16-22 to be fluidly connected to one of the retorts 12, 14. The arrangement of the baths 16-22, valves, and infiltrating material lines enables samples in one retort 12, 14 to be washed with up to four different infiltrating materials. Further, the infiltrating material may be heated in one or more baths 16-22 while the processor 10 is in operation and drawing infiltrating material from the remainder of the baths 16-22.

During the infiltrating step, the wax is drawn into the retort 12 by opening the valve between the retort 12 and appropriate infiltrating bath 16-22, such as ret1-*vfls*, then reducing the pressure in the retort 12 using the pump 44 and opening valves air-vprs and ret1-*vair*. The reduced pressure in the retort 12 draws the wax into the retort 12. Typically, the pressure may be −20 to −80 kpa gauge, however a wide variety of pressures may be used, and these are user programmable via the controller 25. The wax may be heated to a temperature above or approximately the same as the boiling temperature of the dehydrating fluid used in the last or last few washes. If an isopropanol is used, the boiling temperature will be approximately 82 degrees Celsius at atmospheric pressure. Ethanol typically boils at 78 degrees Celsius. After the retort 12 has been draining of dehydrating fluid, some fluid remains on or absorbed by the tissue samples. The tissue samples may then be subjected to a drying stage as described above to remove further dehydrating fluid, and the retort 12 flushed with clean air. Wax is then drawn into the retort 12. Upon contact with the heated wax, the remaining dehydrating fluid is evaporated or boiled off the tissue samples, and the wax replaces the dehydrating fluid, thus infiltrating the samples. The pump 44 may continue to draw off air or vapour from the retort 12 to reduce the pressure in the retort 12, which will reduce the evaporation temperature of the dehydration fluid. As an example, the pressure in the retort 12 may be reduced by 50 kpa gauge, resulting in a boiling temperature of approximately 52 degrees Celsius for the isopropanol. Reducing temperatures of the wax contacting the tissue samples may provide an advantage, for example where certain types of tissues do not perform well when exposed to high temperatures. Typically the paraffin wax used (Paraplast+from Oxford Laboratories) melt at about 54 degrees Celsius. Other infiltrating materials may be used including resins used in histological processes for infiltrating tissue samples. In the present example, the alcohol used at the last stage, isopropanol, is not substantially miscible with paraffin wax. This means that infiltrating fluid is unlikely to penetrate the tissue sample if the previous fluid in the retort was immiscible with the infiltrating fluid. Boiling the volatile dehydrating material off therefore enables the omission of step whereby an intermediary fluid such as xylene, which is miscible in alcohol and paraffin wax, is required. Xylene has undesirable properties in a laboratory. However, xylene will also evaporate when exposed to temperature around 80 degrees, especially when applying a vacuum as described herein has lowered the pressure inside the retort 12. Thus the present example enables the tissue samples to be used without a xylene wash cycle, but also may be used with fluids such as xylene. There are advantages in not using xylene, including that xylene is miscible in wax, and therefore can be absorbed into the wax as a contaminant. However, in some instances it is desirable to use xylene, for example when the tissue requires clearing and the dehydrating fluid such as isopropanol is deemed to be insufficient. Further, xylene may be used after a processing cycle to clean excess wax from the retort 12, and therefore xylene may be present in the prior art tissue processor 10.

It is possible to clean the infiltrating fluid of some of the volatile contaminants, such as dehydrating fluid, clearing fluids such as xylene, by holding the wax in the bath 16-22 and reducing the pressure in the bath 16-22. This clean cycle is done with the bath lid closed, whereupon the reduced pressure and holding the infiltrating material at an elevated temperature such as between 60 degrees and 100 degrees Celsius. The temperature may be held between 65 degrees and 85 degrees Celsius. By volatile material, it is meant that at the temperatures mentioned herein, and/or at reduced pressure, the material will boil or evaporate.

The vapour pressure of the dehydration fluid within the air line 30 in the container 26 may also be reduced, for example, by venting air in the retort 12, either while maintaining a low pressure or cycling through pressure ranges. The infiltrating fluid may be held in the bath 16-22 at an elevated temperature for several hours to clean away contaminants.

The use of two retorts 12, 14 allows two sets of baskets 62 to be processed either simultaneously or with an overlap. Thus one retort 12 can be loaded and a protocol begun while the other retort 14 is mid-way through the same or a different protocol. This provides additional flexibility in the prior art tissue processor 10.

The tissue samples referred to may be human or animal tissue samples, or samples from plant material.

An example protocol for tissue samples, such as a 3*mm* punch human biopsy sample, will now be described:

| Step | Reagent | Time (min) | Temp (c.) | Retort Pressure | Agitation |
| --- | --- | --- | --- | --- | --- |
| 1 | Formalin | 5 | 60 | Ambient | Yes |
| 2 | 50/50 Ethanol water | 25 | 60 | Ambient | Yes |
| 3 | 80/20 Ethanol water | 35 | 60 | Ambient | Yes |
| 4 | Isopropanol | 30 | 60 | Ambient | Yes |
| 5 | Paraffin Wax | 40 | 60 | Vacuum | Yes |
| 6 | Paraffin Wax | 5 | 60 | Vacuum | Yes |
| Total processing time | | 140 | | | |

Another protocol is as follows:

| Step | Reagent | Time (min) | Temp (c.) | Retort Pressure | Agitation |
| --- | --- | --- | --- | --- | --- |
| 1 | Formalin | 60 | 40 | Ambient | Yes |
| 2 | 80% Ethanol | 45 | 40 | Ambient | Yes |
| 3 | 90% Ethanol | 45 | 40 | Ambient | Yes |
| 4 | 100% Ethanol | 60 | 40 | Ambient | Yes |
| 5 | 100% Ethanol | 60 | 40 | Ambient | Yes |
| 6 | 100% Ethanol | 60 | 40 | Ambient | Yes |
| 7 | 100% Ethanol | 60 | 40 | Ambient | Yes |
| 8 | Isopar or d-limonene | 60 | 40 | Ambient | Yes |
| 9 | Isopar or d-limonene | 75 | 40 | Ambient | Yes |
| 10 | Isopar or d-limonene | 75 | 40 | Ambient | Yes |
| 11 | Paraplast | 70 | 60 | Vacuum | Yes |
| 12 | Paraplast | 60 | 60 | Vacuum | Yes |
| 13 | Paraplast | 60 | 60 | Vacuum | Yes |
| Total processing time | | 790 | | | |

From the above it can be seen that xylene is not required in this protocol, and that the protocol has few steps, saving time.

A contamination detector 68 may be placed in the reagent line 34 to detect the presence of contaminants in the reagents. To drain the retort 12, the pump may increase pressure in the retort 12 by pumping air along the same air lines 34 as used to draw reagent into the retort 12. Waste reagent may be drained into a reagent container 26, or be expelled to waste port 72. Infiltrating fluid may also be drained from the retort 12 to waste 70 by this method, and similarly infiltrating fluid may be drained from the baths 16-22 using positive pressure.

In the above examples the dehydrating fluid is immiscible with the infiltrating material. However, the above process offers advantages even if a clearing cycle is used, where the clearing fluid is miscible with the dehydrating fluid and the infiltrating material. Further, additives may be used to increase the clearing properties of the dehydrating material, as well as increasing the miscibility of the fluids in the dehydrating and infiltrating steps.

While raising the temperature of the infiltrating fluid above the boiling temperature of the dehydrating reagent (or clearing reagent) will result in faster removal of the reagent, reagent will still be removed at or around the boiling temperature provided the partial pressure in the retort 12 is lower than the partial pressure of the reagent at the given temperature. This can be accomplished by reducing the pressure in the retort 12, then allowing some fresh air into the retort. Bringing fresh air into the retort 12 while removing air laden with vapour will reduce the partial pressure of reagent in the air in the retort 12 thus promoting more evaporation of the reagent. If the reagent is miscible with the infiltrating fluid it may not be necessary to remove all the reagent to obtain infiltration. However, if the samples can withstand the temperature it is preferable to raise the temperature of the infiltrating fluid within the retort 12 to a temperature above the boiling temperature of the reagent for the given pressure. A temperature about the boiling temperature of a reagent for a given pressure may be typically a few degrees, such as 5 degrees Celsius, of the boiling temperature.

Other dehydrating fluids are contemplated as being able to be used with the prior art tissue processor 10, such as: methanol, butanol, ethylene glycol, propylene glycol, industrial methylated spirits, denatured alcohol (including alcohol denatured with kerosene, benzene or brucine), reagent grade alcohols, acetone and combinations thereof, however this list is merely representative and is not intended to encompass an exhaustive list of reagents useful in the prior art tissue processor 10 described herein.

Clearing reagents such as di-pentene, D-limonene, 1,1,1, trichloroethane, toluene, and dioxane are also contemplated, and again this list is meant to be indicative of the types of reagents that may be used, rather than an exhaustive list. The reagents above, and other reagents suitable for histological processes such as dehydrating, clearing or a combination thereof, may be used in the present apparatus with the step of evaporating the reagent from the sample using heating of the infiltrating fluid, provided the reagents evaporate without leaving a residue. While reagents such as butanol have a boiling point of approximately 118 degrees Celsius at atmospheric pressure, the boiling point drops dramatically with a reduction in ambient pressure. While it is believed preferable to not heat most tissues above 85 degrees Celsius, some types of well fixed tissue will survive this temperature without damage, and therefore higher temperatures may be used, increasing the range of reagents useful in the above-mentioned processes. Accordingly, the upper temperature which may be used is dependent on the tissue, and therefore in well fixed tissue, temperatures may exceed 100 degrees Celsius. Reducing pressure in the retort 12 will assist in reducing temperatures in the retort 12 by reducing the boiling point of reagents.

Infiltrating materials such as resins and other fluids used in histological tissue processing are also contemplated in the above examples, and prior art tissue processor 10 is not intended to be limited to the infiltrating materials mentioned herein. It is also contemplated that infiltrating material may be mixture of substances, such as mineral oils and paraffin wax.

Improvements in Reagent Management

The prior art tissue processor 10 disclosed in WO 03/029845 and as described herein can be operated by a reagent management system that controls reagent use for optimal tissue processing results. An exemplary reagent management system and method of managing resources of a histological tissue processor, such as the prior art tissue processor 10, is described in International PCT Application No. PCT/AU2004/001337, publication No. WO 2005/031312, titled "System and Method for Histological Tissue Specimen Processing", published on 7 Apr. 2005 and filed by Vision Biosystems Limited.

The reagent management system can include a concentration management module that preferably uses a calculation method to determine reagent concentration at each station/bottle of a tissue processor, such as prior art tissue processor 10. The calculation method involves using an initial station concentration, which may be set to the reagent's default value, and tracking station use to calculate an estimate of the current concentration of the reagent. Tracking station use can include calculating an estimate of reagent carry over from the retort walls, baskets and biopsy pads used by the tissue processor. The reagent management system then operates the tissue processor based on the calculated reagent station concentration level.

The present invention provides improvements in reagent management by providing a tissue processor 100 that includes at least one sensor 74, 76 for measuring a measured purity level of a reagent. Ideally, the measured purity level is a concentration value of the reagent derived from a measured parameter value. The present invention further provides a method of operating the tissue processor 100, which may be computer-implemented by a computer program product, and a controller 25 of the tissue processor 100 that is configured to perform the method.

In contrast to the reagent management system of WO 2005/031312 and as described above, the inventive tissue processor 100 with controller 25 and method of operating the tissue processor 100 can measure the actual reagent concentration, by means of the at least one sensor 74, 76, before or during operation of the tissue processor 100 to perform a tissue processing, protocol. Accordingly, the reagent management system can control reagent use on the basis of the measured reagent concentration values instead of calculated reagent concentration values based on an estimate of reagent carry over. The present invention therefore provides greater accuracy and reliability in measuring reagent concentration due to the at least one sensor 74, 76. Furthermore, the present invention enables the reagent management system to more readily control tissue processor workflows as the reagent quality can be validated before or during operation of the tissue processor 100.

For simplicity, the same reference numerals have been used for features of the tissue processor 100 according to embodiments of the invention that correspond to the same features of the prior art tissue processor 10. It is intended that the above description of the prior art tissue processor 10 and disclosure of WO 03/029845 is relevant to the features of the tissue processor 100 with the same reference numerals. The tissue processor 100 can, in some embodiments, include one or more features of the prior art tissue processor 10, although not explicitly mentioned in the following description of preferred embodiments of the invention. A person skilled in the art would appreciate how the features of the prior art tissue processor 10 could be implemented with respect to the tissue processor 100 according to embodiments of the invention. It should be appreciated, however, that embodiments of the invention are not limited to having identical components or all of the components of the prior art tissue processor 10 disclosed in WO 03/029845 and as described herein. For example, embodiments of the invention may be directed to tissue processors or methods of operating tissue processors that differ from the prior art tissue processor 10 and that only comprise a single retort, as will be described herein.

The tissue processor 100 of the present invention includes at least one retort 12 for receiving tissue samples, at least one container 26 for storing a reagent, and at least one sensor 74 arranged for fluid communication with one or both of the at least one container 26 and the at least one retort 12 for measuring a measured purity level of a reagent.

Embodiments of the tissue processor 100 are illustrated in simplified schematic block diagrams as shown in FIGS. 9a-d and 10. The electrical connections between the sensors 74, 76, manifold 38, reagent valve 40, air pump 44, controller 25, and other elements have been omitted from the figures for clarity, and are considered as standard fittings known to a person skilled in the art, and understood with reference to the prior art tissue processor 10 as shown in FIGS. 1 to 8.

Figure 9A:
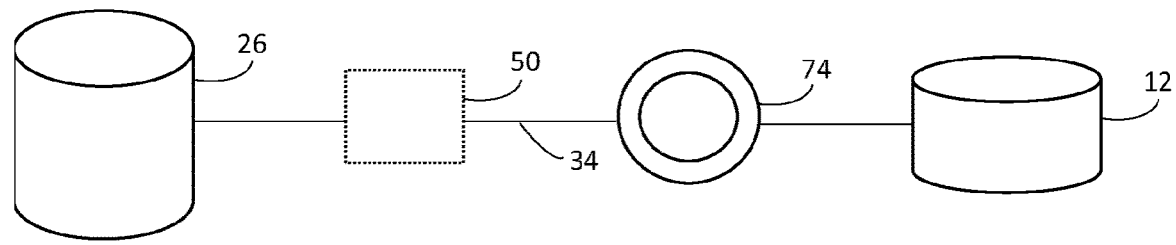
FIGS. 9a and 9b are simplified schematic block diagrams of a tissue processor according to embodiments of the invention, showing a reagent line connecting a container and a retort with a sensor arranged in the reagent line.
Figure 9B:
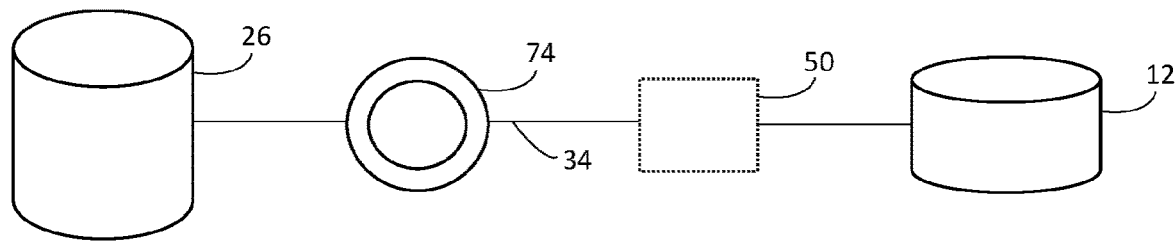

Referring to FIGS. 9a and 9b, the tissue processor 100 can include a reagent line 34 connecting the container 26 and the retort 12. The sensor 74 can be arranged in the reagent line 34, positioned between the container 26 and retort 12. A valve mechanism 50 can be optionally included in the reagent line 34 to control flow of a reagent between the container 26 and retort 12, depending on the direction of flow during a tissue processing protocol. For example, on filling of the retort 12, reagent will be conducted from the container 26 to the retort 12 in the reagent line 34. Conversely, on draining of the retort 12, the direction of flow will be reversed as controlled by the valve mechanism 50. In some embodiments, the valve mechanism 50 may include the reagent valve 40 of the prior art tissue processor 10. The sensor 74 can be positioned in the reagent line 34 between the valve mechanism 50 and retort 12 or between the container 26 and valve mechanism 50, as shown respectively in FIGS. 9a and 9b. Preferably, the sensor 74 is positioned between the valve mechanism 50 and retort 12 as shown in FIG. 9a.

Figure 9C:
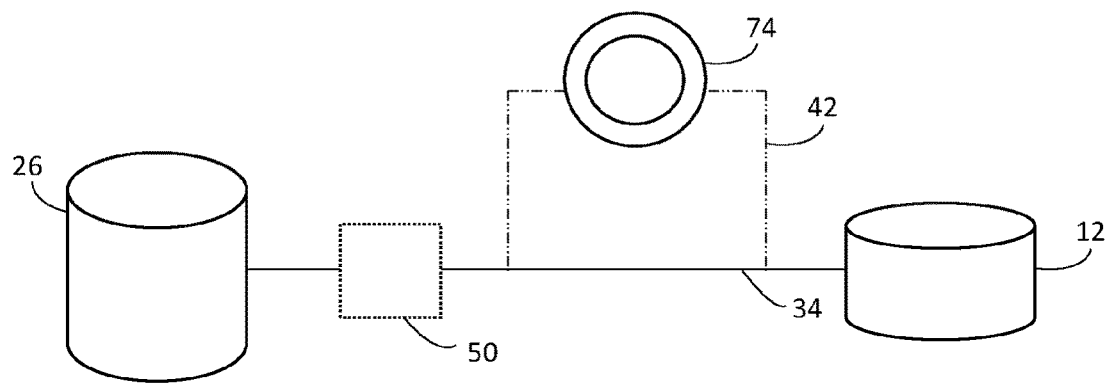
FIGS. 9c and 9d are simplified schematic block diagrams of a tissue processor according to embodiments of the invention, showing a reagent line connecting a container and a retort with a sensor arranged in a bypass line in FIG. 9c and in a dedicated line in FIG. 9d.

Alternatively, in the embodiment of FIG. 9c the sensor 74 is arranged in a bypass line 42 that receives a portion of the reagent when the reagent is conducted in the reagent line 34. The bypass line 42 is positioned between the optional valve mechanism 50 and the retort 12 as shown in FIG. 9c. However, the bypass line 42 could be positioned between the container 26 and the optional valve mechanism 50. Further, in other embodiments the bypass line 42 could connect to the reagent line 34 on either side of the valve mechanism 50. Entry of reagent to the bypass line 42 from the reagent line 34 could also be valved to selectively control the amount of reagent that is conducted to the sensor 74 (not shown).

Figure 9D:
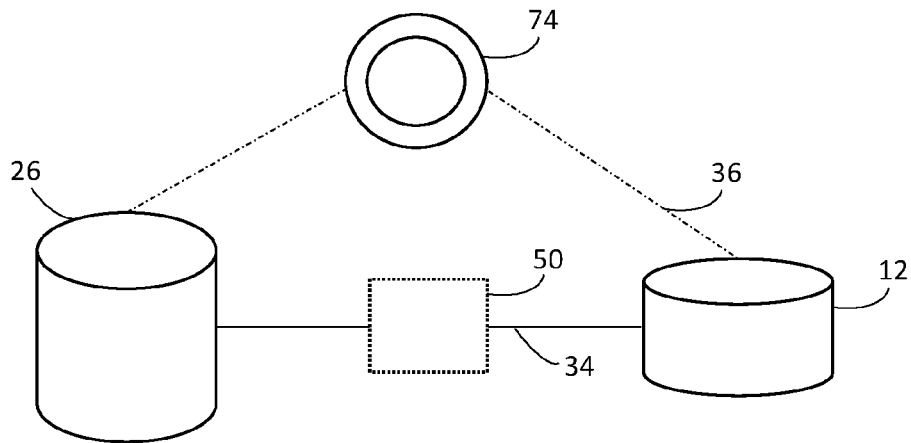

FIG. 9d illustrates another alternative embodiment of the tissue processor 100 in which the sensor 74 is arranged in a dedicated line 36 that is connected to the container 26 and/or retort 12. The dedicated line 36 is shown in broken lines to illustrate that the dedicated line 36 could be fluidly connected to one or both of the container 26 and retort 12. Reagent can be conducted from one of the container 26 or retort 12 in the dedicated line 36 to the sensor 74 for measuring the measured purity level of the reagent. In this regard, an air line 30 may be connected from the air pump 44 to the sensor 74 in order to pump reagent in the dedicated line 36 (not shown).

FIGS. 9a-d illustrates embodiments of the tissue processor 100 that include a single container 26, retort 12 and sensor 74. However, the tissue processor 100 may include a plurality of containers 26 for storing different reagents and/or the same reagent at different concentrations, as shown in FIG. 10.

Figure 10:
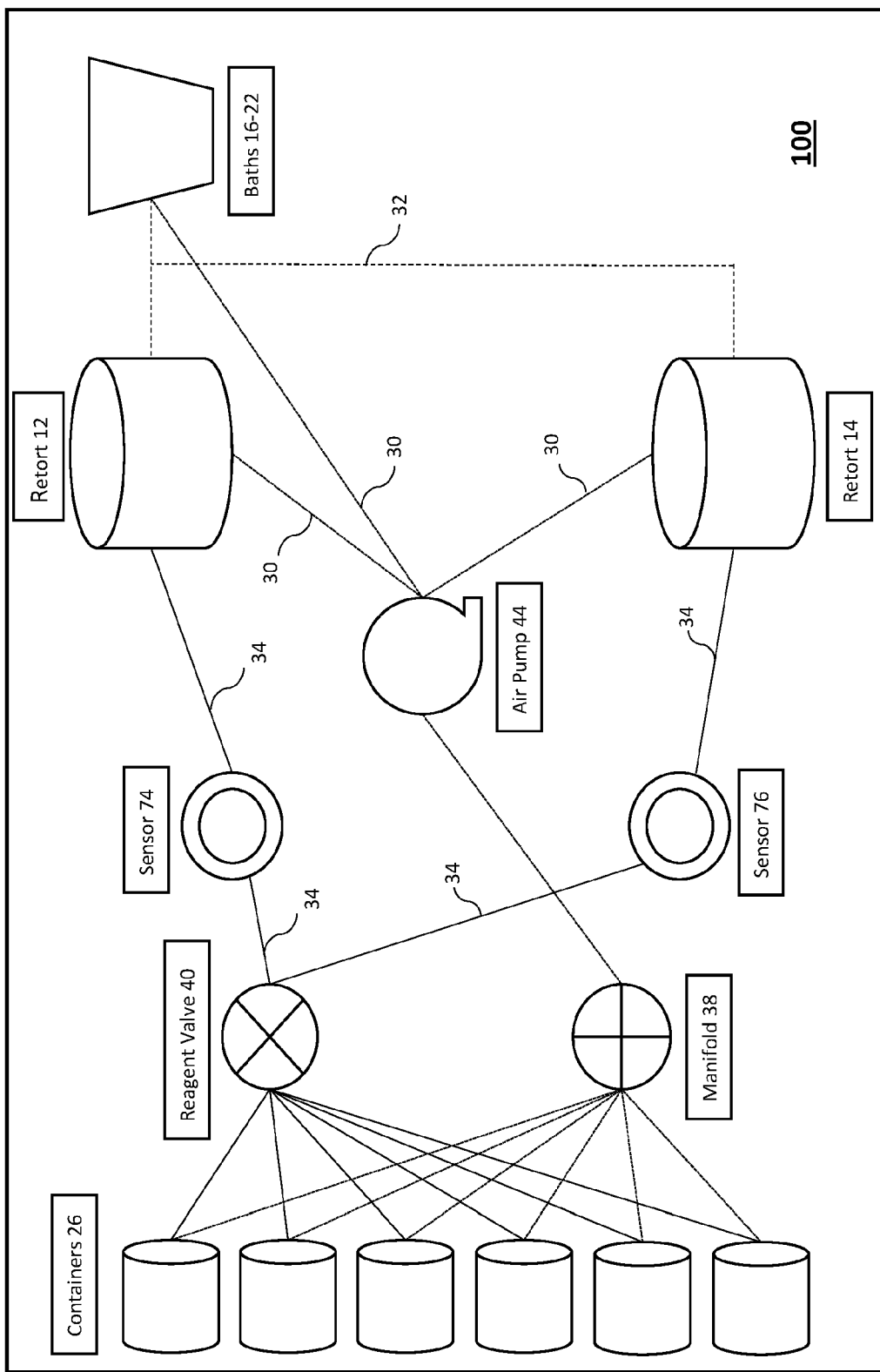
FIG. 10 is a simplified schematic block diagram of a tissue processor according to an embodiment of the invention, showing a plurality of containers connected by a reagent valve to two retorts with a sensor arranged in each reagent line.

A preferred embodiment of the tissue processor 100 is illustrated in FIG. 10. The tissue processor 100 can include a plurality of containers 26 (six shown, although various numbers of containers can be provided), two retorts 12 and 14 and two sensors 74 and 76. The arrangement is similar to that shown and described with reference to FIG. 9a in which each sensor 74 and 76 is positioned in the reagent line 34 between the reagent valve 40 and retorts 12 and 14. However, in other embodiments a single sensor 74 could be positioned between the reagent valve 40 and connecting to both of the retorts 12 and 14 (not shown).

As shown in FIG. 10, the tissue processor 100 can include the reagent valve 40 for selectively connecting each container 26 to the retorts 12 and 14 for conducting reagent therebetween. Further, the tissue processor 100 can include four infiltrating baths 16-22 connected to the retorts 12 and 14 by an infiltrating line 32. The infiltrating baths 16-22 can include infiltrating material such as paraffin wax for use by the tissue processor 100 in performing a tissue processing protocol for infiltrating of tissue samples. The tissue processor 100 can also include the air pump 44 with air lines 30 and manifold 38, which together with a controller 25 enable transport of various fluids, such as process fluids or waste, in the tissue processor 100.

The sensors 74 and 76 preferably are fluid sensors configured to measure the density value of the reagent when conducted thereto from the container(s) 26 or retorts 12 and 14 to the sensors 74 and 76. The sensors 74 and 76 can be densitometers, and preferably, oscillating pipe density meters, which include an oscillating element and measure the damping effect of the reagent flow. Alternatively, the sensors 74 and 76 can be oscillating u-tube or "tuning fork" density meters, or other densitometers as known to a person skilled in the art. Where the sensors 74 and 76 include an oscillating tube, the manifold 38 of the tissue processor 100 shown in FIG. 10 is preferably inclined at an angle. The inclination is such that any air bubbles from the oscillating tube of the sensor 74, 76 can be removed, thereby allowing density measurements to be taken during filling of the retorts 12 and 14, which occur when conducting reagent from the container(s) 26 to the retorts 12 and 14.

Ideally, the sensors 74 and 76 provide minimal fluidic restriction on the fluid/reagent flow in the tissue processor 100. For example, the sensors 74 and 76 may have large internal tube diameters that minimise fluidic restriction. This is particularly important when the sensors 74 and 76 are positioned in the reagent line 34 (see FIGS. 9a-b and 10), for which such restriction may impact on fill and drain times between the container(s) 26 and retorts 12 and 14.

Figure 11:
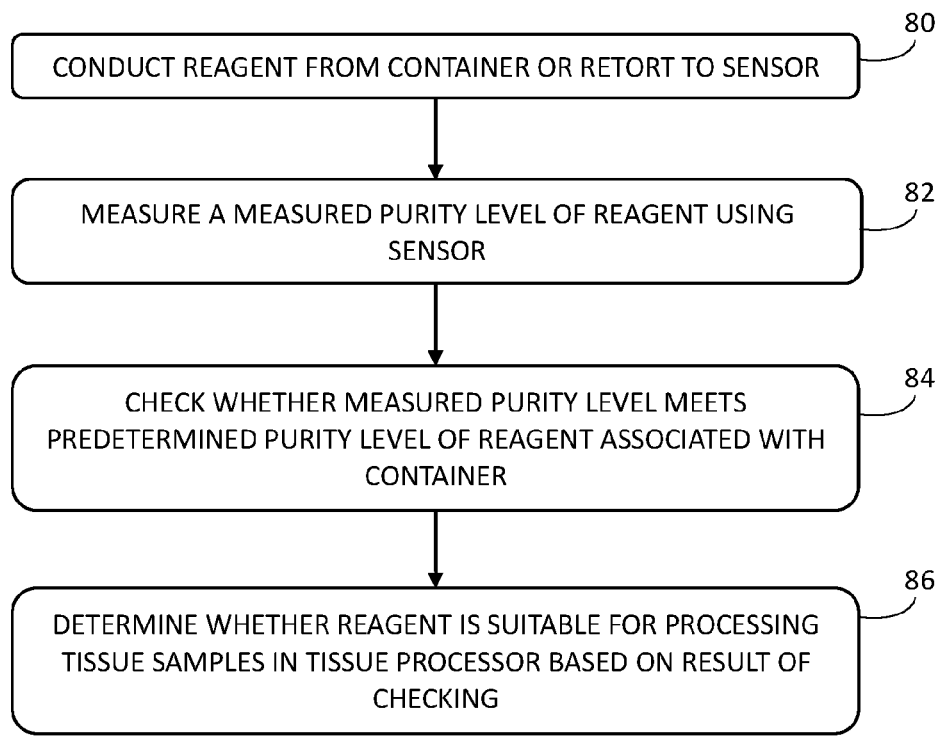
FIG. 11 is a flow chart of a method of operating a tissue processor, that can be performed by a controller of a tissue processor, according to an embodiment of the invention.

Referring now to FIG. 11, the present invention provides a method of operating the tissue processor 100 for processing tissue samples. FIG. 11 is a flow chart of the steps 80-86 of the method of the invention. The method includes at step 80, conducting reagent from the at least one container 26 or the at least one retort 12 to the at least one sensor 74. At step 82, the method further includes automatically measuring, by means of the at least one sensor 74, the measured purity level of the reagent. At step 84, the method further includes checking whether the measured purity level meets a predetermined purity level of the reagent associated with the at least one container 26. The method further includes at step 86 automatically determining, based on a result of checking, whether the reagent is suitable for processing tissue samples in the tissue processor 100.

The predetermined purity level of the reagent can be associated with the at least one container 26 by means of data or information of the reagent that is intended to be stored in the container 26. For example, the container 26 may include an identifier for a specific reagent that is positioned on the physical container 26, such as through use of a label. The identifier may be machine-readable and include a Radio Frequency Identification Device (RFID). The identifier can include information such as the type and/or concentration of the reagent that is to be stored in the container 26.

In some embodiments, the method further includes the step of providing the predetermined purity level of the reagent based on reagent data for the at least one container 26. The reagent data for the at least one container 26 is preferably provided by a user or operator of the tissue processor 100. The tissue processor 100 can further include an input device such as control interface 24, which can include the control interface 24 shown in FIGS. 3 and 8 of the prior art tissue processor 10. The control interface 24 can employ a graphical user interface, and may include a touch-screen display, keyboard and/or mouse, operable by a user to provide the reagent data. The control interface 24 can connected to a controller 25 of the tissue processor 100, which is configured to receive the reagent data from the control interface 24.

Additionally/alternatively, the tissue processor 100 can include a controller 25, which can include the controller 25 shown in FIG. 8 of the prior art tissue processor 10. The controller 25 can be configured to receive the reagent data from a server or computing system, such as through a wireless or hard-wired connection. The controller 25 may be located on the tissue processor 100 in a cabinet 11 as shown in FIG. 3 of the prior art tissue processor 10, or may be part of a stand-alone computer that communicates with the tissue processor 100. The controller 25 may include a personal computer processor such as a Celeron chip by Intel Corporation located on an ETX form factor PCB (not shown). The controller 25 may contain or store a number of predefined protocols (or steps) for processing tissue, the protocols being stored in a non-volatile memory such as a hard drive. Protocols may be programmable by the user to implement a number of steps for tissue processing, or they may be predefined. Typical protocol parameters include which reagents are to be applied to the samples, how long the reagents are to be applied, the temperature at which the reagents are applied, whether agitation is to take place, and whether ambient pressure in the retort 12, 14 is to be changed.

The reagent data preferably includes at least a concentration value of the reagent for the at least one container 26. The user may provide the concentration value, using the control interface 24 or controller 25, as a percentage dilution of the reagent in water, such as 70%, 80% or 100%, or provide a concentration in Molar (M), g/L, mg/mL, to name a few. The reagent data can also include one or more of a reagent type, a reagent name and a container number for the tissue processor 100. For example, the reagent type can include a dehydrating fluid, such as ethanol, methanol, isopropanol, butanol, ethylene glycol, and various alcohols, a clearing reagent, such as xylene, di-pentene, D-limonene, trichloroethane, toluene and dioxane, and an infiltrating material, such as paraffin wax, to name a few.

In preferred embodiments of the invention, the predetermined purity level of the reagent is a concentration level determined based on the concentration value from the reagent data. The concentration level can include one of a threshold value or a tolerance range of values. The threshold value can be the concentration value of the reagent included in the reagent data from the user. Where the concentration level is a tolerance range of values, the range can be determined based on the concentration value included in the reagent data. The method may include determining the tolerance range depending on the reagent type, such as dehydrating fluid, clearing reagent or infiltrating material, and in some embodiments, through a calculation based on the pure reagent concentration or using, a look-up table for the reagent. For example, a smaller tolerance range may be required for reagents in which a variation in concentration level will detrimentally affect the quality of the processed tissue samples.

In some embodiments, the method further includes repeating the measuring step 82 one or more times, preferably three times, and calculating an average of the measured values of a parameter that represents the measured purity level of the reagent. In this case, the calculated average represents the measured purity level of the reagent. The measuring step 82 may include measuring density values of the reagent using the at least one sensor 74, 76, which may be a fluid sensor or densitometer, and thus the calculated average can include an average density value for the reagent. The method may further include a step of deriving from the measured density value or the average of the measured density values, a concentration value of the reagent. The step of deriving the concentration value may include performing a calculation method based on using a look-up table for the pure reagent. The measured purity level of the reagent determined at measuring step 82 preferably includes the derived concentration value.

Accordingly, the checking step 84 of FIG. 11 is preferably performed on the basis of a comparison of concentration values. Ideally, the measured purity level is the concentration value derived from the measured density value or average of measured density values, and the predetermined purity level is the concentration level, being the threshold value or tolerance range of values determined based on the concentration value from the reagent data. The checking step 84 can include checking whether the measured purity level is (i) greater than the threshold value of the predetermined concentration level, or (ii) within the tolerance range of values of the predetermined concentration level.

In alternative embodiments, the predetermined purity level can be a density level determined based on the concentration value from the reagent data. The density level can be a threshold value, where the threshold value can be a density value derived from the concentration value from the reagent data, such as through a calculation based on the pure reagent concentration or using a look-up table for the reagent. Where the density level is a tolerance range of values, the range can be determined based on the derived density value. Furthermore, the measured purity level of the reagent can be, the measured density value or average of measured density values. Thus, in alternative embodiments, the checking step 84 of FIG. 11 is performed on the basis of a comparison of density values.

In some embodiments, the determining step 86 of FIG. 11 includes determining that the reagent is suitable for processing tissue samples when the measured purity level is greater than the threshold value or within the tolerance range of values. Step 86 further includes determining that the reagent is unsuitable for processing tissue samples when the measured purity level is less than the threshold value or falls outside the tolerance range of values. When the reagent is determined to be unsuitable for processing tissue samples, the method can further include the step of flagging the at least one container 26 for non-use by the tissue processor 100. The method can also further include the step of generating, at the tissue processor 100, a notification signal for a user to check the reagent in the flagged container 26. The notification signal can be provided to the user by the input device, such as a control interface 24 having a user display. The notification signal can include a message and/or alarm displayed on the control interface 24 or user display.

The method can be performed prior to operating the tissue processor 100 to perform a tissue processing protocol using the reagent. This method requires a dedicated tissue processor workflow to check the measured purity level of the reagent prior to use in a tissue processing protocol by the tissue processor 100. Referring to FIG. 9d, the tissue processor 100 includes a dedicated line 36 connecting the container 26 or the retort 12 to the sensor 74. The dedicated line 36 is separate from the reagent line 34 that connects the container 26 and retort 12. In some embodiments, the method includes at step 80, conducting reagent in the dedicated line 36 from the container 26 or the retort 12 to the sensor 74.

The dedicated tissue processor workflow requires a specific action to fill and drain reagent to the dedicated line 36 to measure the purity level or concentration of the reagent. For example, reagent can be stored in the container 26 and conducted to the sensor 74 in order to screen the reagent and check its purity level or concentration prior to use by the tissue processor 100. If the method determines at step 86 that the reagent is unsuitable for use, the container 26 associated with the reagent, i.e. the container 26 for storing, the reagent, can be flagged for non-use. The "flagging" may be software-implemented in a reagent management system that locks-out the container 26 for use in tissue processing protocols. The "flagging" may result in selection by the reagent management system of an alternative container 26 for use in a tissue processing protocol. Furthermore, the method can include generating a notification signal for a user to check the reagent in the flagged container 26. The notification signal can be a message and/or alarm displayed on the control interface 24 or user display.

In another example, reagent can be stored in the retort 12 and conducted to the sensor 74 in order to screen the reagent and check its purity level or concentration prior to conducting the reagent to its associated container 26. If the method determines at step 86 that the reagent is unsuitable for use, the container 26 associated with the reagent, e.g. in this case the container 26 storing the reagent, can be flagged for non-use as above, and further, the reagent can be conducted to a waste line of the tissue processor 100 for removal therefrom so as to not contaminate or dilute any reagent currently in the associated container 26.

In other embodiments, the method is preferably performed when operating the tissue processor 100 to perform a tissue processing protocol using the reagent. This method can be implemented in two ways, (i) adapting a tissue processor workflow for a tissue processing protocol to check the reagent during use (e.g. filling/draining of the retort 12, 14) by the tissue processor 100, and (ii) a monitoring tissue processor workflow for calculating contamination of the reagent from successive uses in tissue processing protocols.

Advantageously, the adapted workflow and monitoring workflow minimises inefficiency in operation of the tissue processor 100 as it avoids additional checks and retort cleans that are required to perform the dedicated workflow described above.

Referring to FIGS. 9*a*-*c* and 10, the tissue processor 100 can include a reagent line 34 connecting the at least one container 26 and the at least one retort 12, 14. The at least one sensor 74, 76 is arranged in fluid communication with the reagent line 34. The sensor 74, 76 can be positioned in the reagent line 34 as shown in FIGS. 9*a*-*b* and 10, or alternatively, positioned in a bypass line 42 that receives a portion of the reagent when the reagent is conducted in the reagent line 34 as shown in FIG. 9*c*. With these embodiments of the tissue processor 100, the method can be performed on filling of the retort 12, 14 with reagent at the start of a tissue processing protocol and/or on draining of the retort 12, 14 to remove reagent at the end of a tissue processing protocol, since the reagent from reagent line 34 conducted between the container 26 and retorts 12 and 14, will pass through the sensor 74, 76 positioned in the reagent line 34 or bypass line 42.

For the adapted tissue processor workflow, the method further includes the step of operating the tissue processor 100 to stop filling or draining of the at least one retort 12, 14 to perform at least method steps 82-86 of FIG. 11. On filling of the retort 12, 14, the method can include operating the tissue processor 100 to stop filling prior to reagent contacting tissue samples stored in the at least one retort 12, 14. On draining of the retort 12, 14, the method can include operating the tissue processor 100 to stop filling prior to reagent being delivered to the at least one container 26 associated with the reagent. The stopping step advantageously enables the reagent purity level or concentration to be checked prior to potentially contaminating and/or destroying tissue samples on filling and then processing in the retort 12, 14, and prior to potentially contaminating and/or diluting any reagent in the associated container 26 on draining of the reagent from the retort 12, 14. This desirably enables the reagent quality to be verified before or during operation of the tissue processor to perform a tissue processing protocol using the reagent, which can thereby avoid user error and potential suboptimal tissue processing of the tissue samples.

When the reagent is determined to be suitable for processing tissue samples at step 86 of FIG. 11, the method can further include the step of operating the tissue processor 100 to continue filling or draining of the retort 12, 14 to complete the tissue processing protocol. Otherwise, when the reagent is determined to be unsuitable for processing tissue samples, the method can further include the step of operating the tissue processor 100 to abandon the tissue processing protocol.

Figure 12:
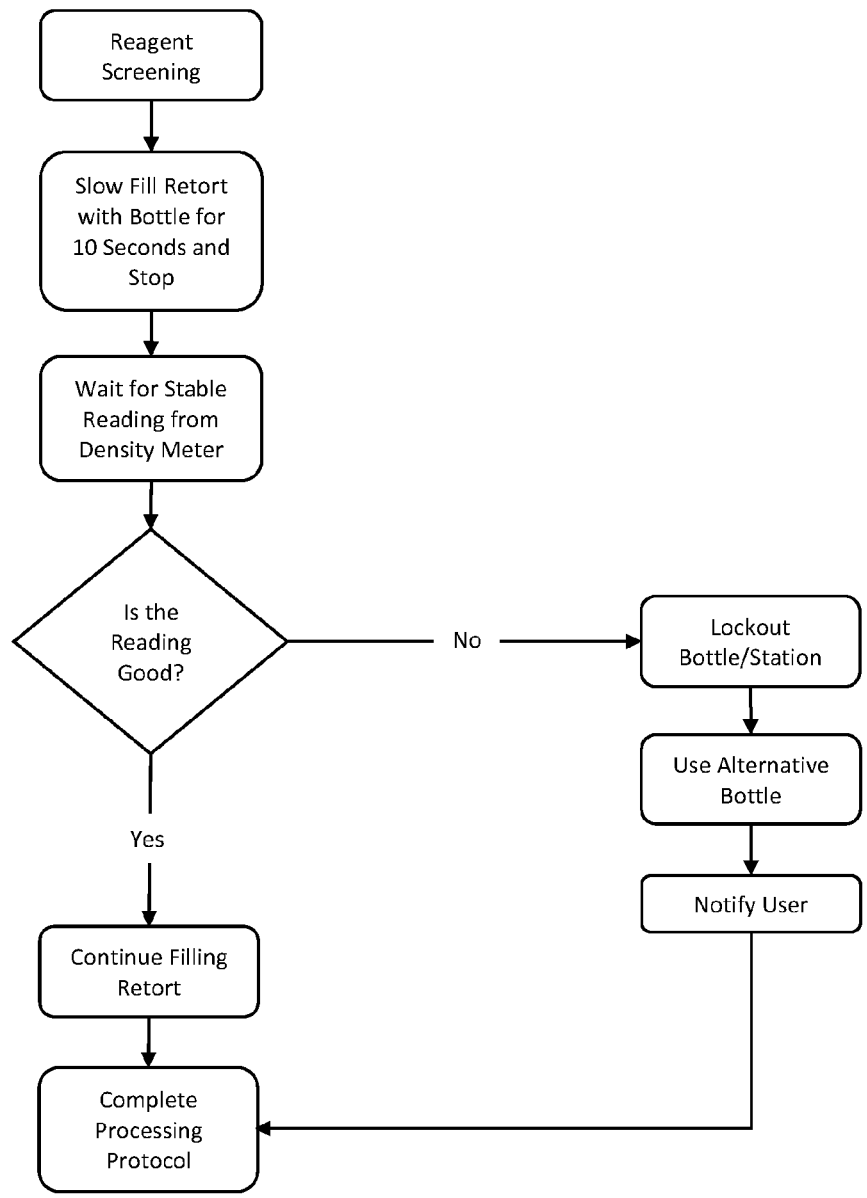
FIG. 12 is a simplified flow chart of a workflow for reagent screening on retort filling incorporating the method of FIG. 11.

The adapted tissue processor workflow on filling of the retort 12, 14 is illustrated in a preferred embodiment of the invention as shown in the flow charts of FIGS. 12 and 13*a*-*c*. FIG. 12 is a simplified flow chart of a workflow for reagent screening (i.e., checking reagent purity level, particularly concentration) on retort filling that incorporates the method of FIG. 11 and embodiments as described herein. The flow chart begins with slowly filling the retort 12, 14 with reagent from a container 26. Preferably, the retort is filled for 10 seconds and the tissue processor 100 is operated to stop filling prior to reagent contacting tissue samples stored in the retort 12, 14. The next step in the workflow is to wait for a stable reading from the density meter 74, 76. Next, the reading from the density meter 74, 76 is checked, which involves performing method steps 82 and 84. The workflow next determines if the reading is good, which involves performing method step 86. If the reading is good, the retort 12, 14 is continued to be filled with the reagent and the processing protocol is completed. Otherwise, the container 26 associated with the reagent is locked-out for use by the tissue processor 100 and an alternative bottle/container 26 (in embodiments with a plurality of containers 26) is selected for use in the tissue processing protocol. The user is notified regarding the locked-out or flagged container 26, such as by the control interface 24, and the option to use an alternative bottle/container 26. The workflow then abandons the tissue processing protocol and waits for the user to take further action, e.g. replace the reagent in the flagged container 26 or select the alternative bottle/container 26.

Figure 13A:
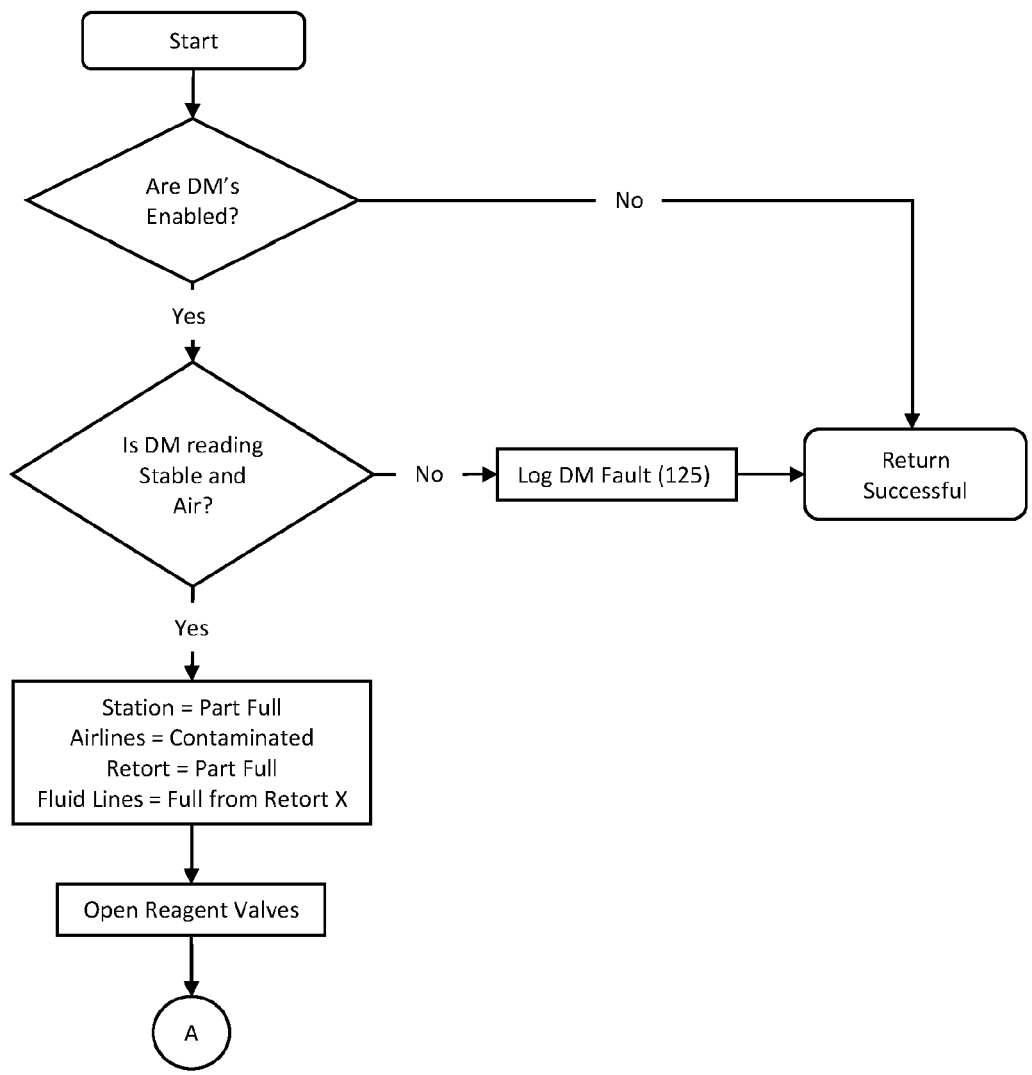
FIGS. 13a to 13c are more detailed flow charts of the workflow for reagent screening shown in FIG. 12.
Figure 13B:
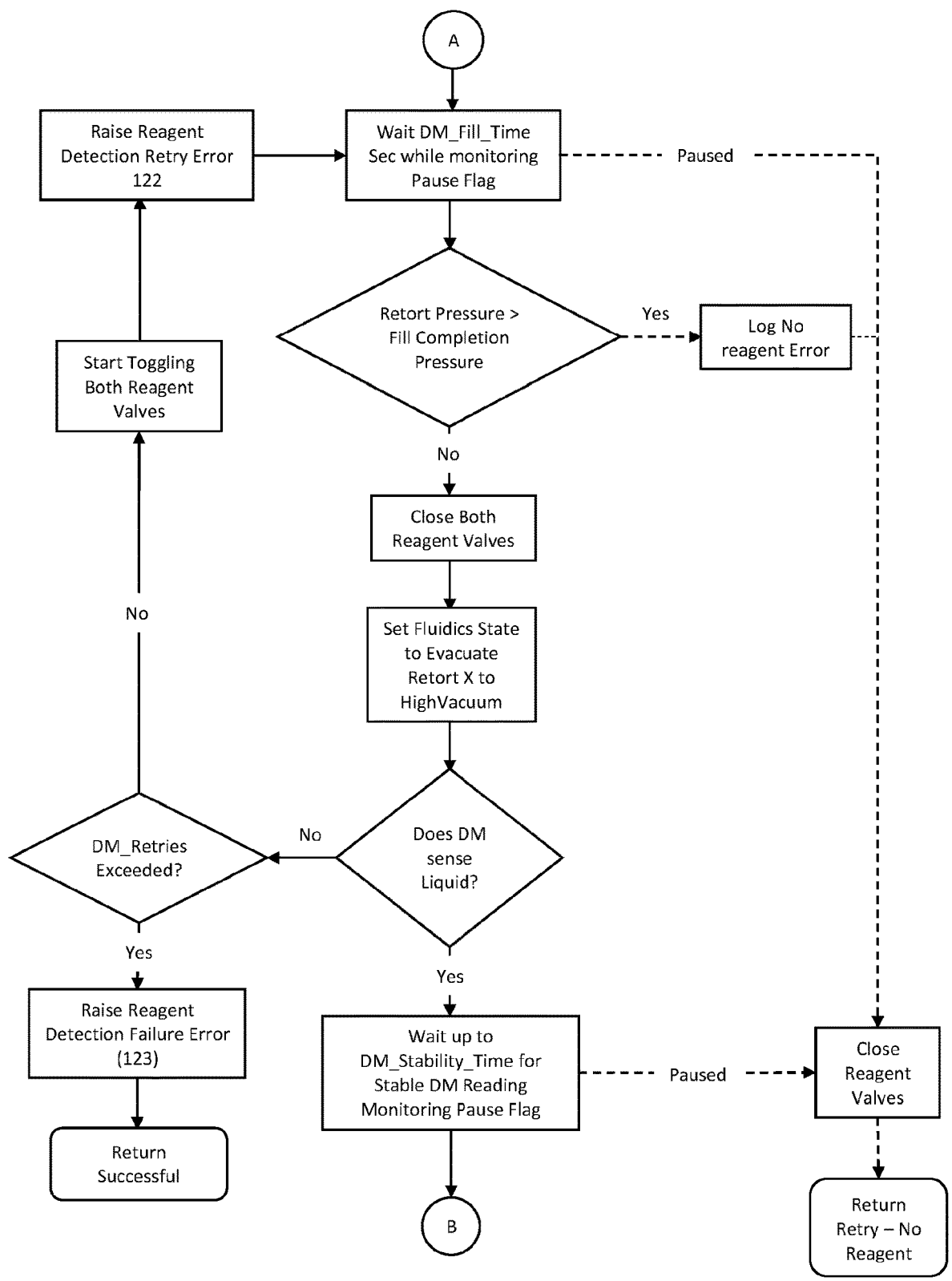
Figure 13C:
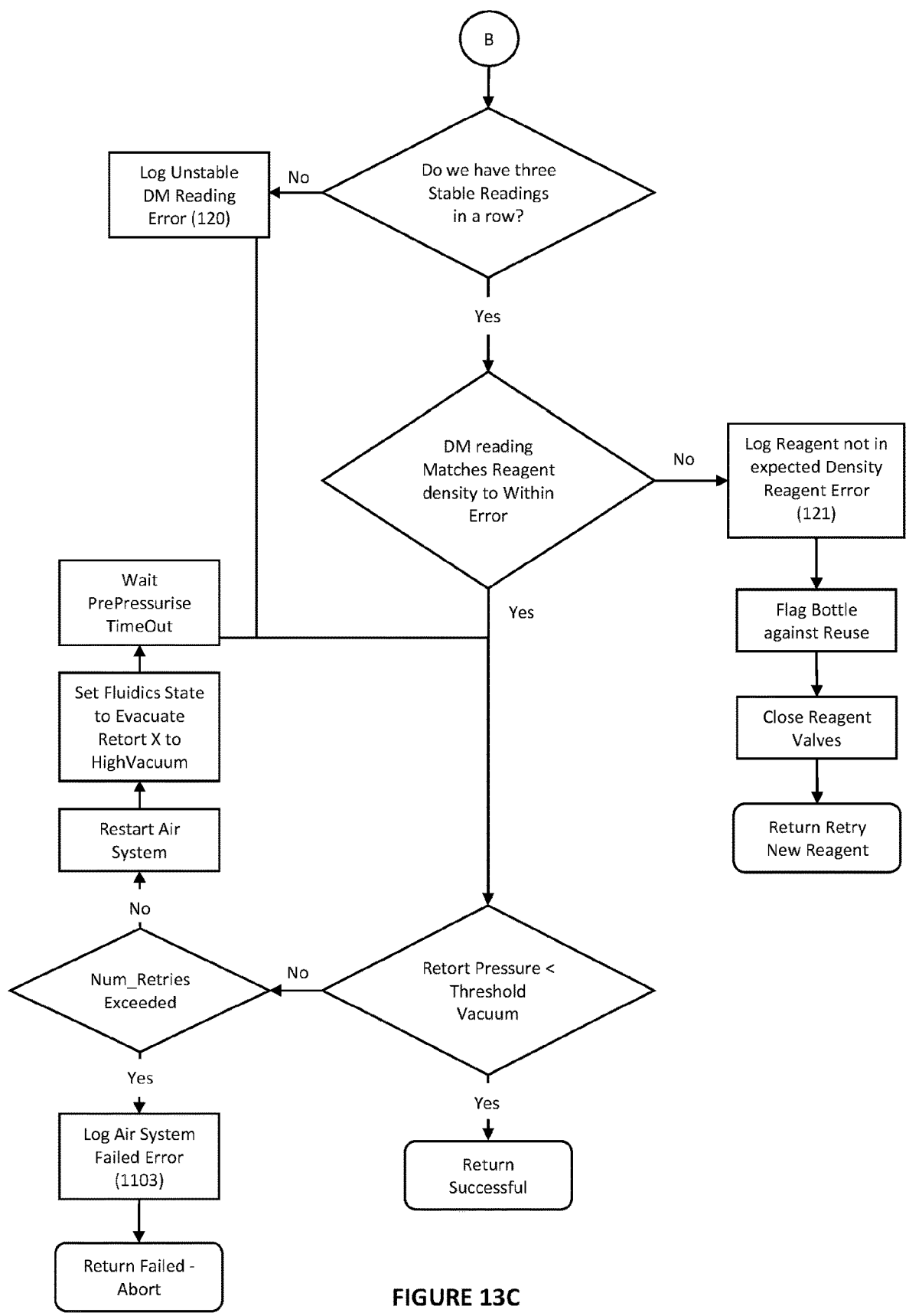

Referring to FIGS. 13*a*-*c*, more detailed flow charts of the workflow for reagent screening shown in FIG. 12 and described above are provided. In particular, FIG. 13*a* shows additional steps in the workflow which checks if the density meter(s) 74, 76 is enabled by the tissue processor 100, and otherwise logs a DM Fault (125). Once the density meters 74, 76 are enabled, the reagent valves (such as ret1-*vrgt* and ret2-*vrgt* from FIG. 2 of the prior art tissue processor 10) are opened for filling of the retort 12, 14 with reagent. FIG. 13*b* shows detail of the stopping of filling of the retort 12, 14 in order to take the density measurement and check the reagent purity level or concentration. The stopping can be achieved by implementing a "Paused" function in the tissue processor workflow as shown in FIG. 13*b*, which pauses the tissue processing protocol and filling of the retort 12, 14 for a time period until the density measurement is performed and reagent purity level or concentration checked. FIG. 13*c* shows detail of the method steps 82-86 being performed, in which three stable density readings are taken and the density meter (DM) reading (e.g. an average of the three density measurements) is checked to see if it matches the expected reagent density (e.g. predetermined value based on reagent data from user) to within an error or tolerance. If the DM reading does not match to within the error or tolerance, the workflow logs a Reagent not in expected Density Reagent Error (121), flags the bottle 26 against reuse, closes the reagent valves and returns "Retry New Reagent". This may involve a notification signal or message being generated for the user to view and take appropriate action, such as selecting an alternative bottle/container 26 or replacing the reagent in the container 26.

The adapted tissue processor workflow as described above can be implemented in a monitoring tissue processor workflow performed by the reagent management system. The monitoring tissue processor workflow includes performing the adapted tissue processor workflow one or more times, and preferably on both filling and draining of the retort 12, 14 during a tissue processing protocol performed by the tissue processor 100. This enables the reagent purity level or concentration to be validated before and after use of the reagent in a tissue processing protocol. Ideally, the monitoring tissue processor workflow performs the adapted tissue processor workflow each time a tissue processing protocol is performed by the tissue processor 100, which enables data of the reagent purity level or concentration to be collected on successive uses of the reagent by the tissue processor 100.

In some embodiments, the tissue processor 100 includes a first container for storing a first reagent and a second container for storing a second reagent. The first and second containers may include reagent containers 26 as shown in FIGS. 9*a*-*d* and 10. However, the first container may include an infiltrating bath 16-22 or alternative container of the tissue processor 100 that stores a reagent or treatment fluid used by the tissue processor 100 to treat tissue samples in the retort 12, 14.

For the monitoring tissue processor workflow, the method can further include the step of operating the tissue processor 100 to perform a tissue processing protocol using the first reagent and the second reagent. Preferably, the first reagent is used in the tissue processing protocol prior to the second reagent being used. The tissue processing protocol can include treating tissue samples in the retort 12, 14 with the first reagent by conducting or pumping the first reagent to and/or from the first container to the retort 12, 14 on filling and/or draining of the retort 12, 14. Ideally, the tissue processing protocol then includes the same steps of treating the tissue samples in the retort 12, 14 with the second reagent.

Advantageously, the method for the monitoring tissue processor workflow can include automatically determining a carry over volume of the first reagent from the first container into the second reagent from the second container. The carryover volume can be determined by firstly, providing an initial volume of the second reagent in the second container, which can be provided by the user via the input device 24 or controller 25. Then the method includes performing the measuring step 82 to measure, using the sensor 74, 76, a density value of the first reagent on draining of the retort 12, 14 and a density value of the second reagent on filling and draining of the retort 12, 14. The carry over volume can then be calculated automatically according to:

$$V_{CO} = \frac{\rho_{C2_{out}} - \rho_{C2_{in}}}{\rho_{C1_{out}} - \rho_{C2_{out}}} \times V$$

wherein: $V_{CO}$=volume of carry over (L), $\rho_{C2_{out}}$=measured density value of the second reagent on draining of the at least one retort (kg/m$^3$), $\rho_{C2_{in}}$=measured density value of the second reagent on filling of the at least one retort (kg/m$^3$), $\rho_{C1_{out}}$=measured density value of the first reagent on draining of the at least one retort (kg/m$^3$), and V=initial volume of the second reagent in the second container (L).

The carry over volume is representative of the volume of the first reagent that has contaminated the second reagent during successive uses by the tissue processor 100. This information can be used by the reagent management system to control use of reagents by the tissue processor 100, such as by selecting the specific reagents and their order of use in a tissue processing protocol. Further, the carry over volume can be used by the reagent management system to estimate the contamination levels of reagents/treatment fluids from other containers, such as the infiltrating baths 16-22. This is particularly advantageous as the purity level or concentration of the infiltrating fluids such as paraffin wax from the infiltrating baths 16-22 is not measured by the sensor 74, 76 of the tissue processor 100. Accordingly, this method of calculating the carry over volume using actual measured reagent concentration provides accuracy in the calculation of the purity level or concentration of infiltrating fluids or other fluids by the reagent management system.

The present invention also provides a tissue processor 100 that includes at least one retort 12 for receiving tissue samples, at least one container 26 for storing a reagent and at least one sensor 74 arranged for fluid communication with one or both of the at least one container 26 and the at least one retort 12 for measuring a measured purity level of a reagent. The measured purity level is preferably a concentration value derived from a measured parameter value. The tissue processor 100 also includes a controller 25 configured to perform the method of operating a tissue processor according to steps 80-86 of FIG. 11.

In preferred embodiments of the invention, the controller 25 is also configured to perform any of the additional method steps described above and with reference to FIGS. 11, 12 and 13*a*-*c*. Accordingly, the method of operating the tissue processor 100 can be implemented through the controller 25 and further in software, firmware and/or hardware in a variety of manners as would be understood by a person skilled in the art.

The present invention also provides a computer program product including a computer readable medium having computer readable program code and computer readable system code embodied on the medium for, operating a tissue processor (such as tissue processor 100), within a data processing system, where the computer program product includes computer readable code within the computer readable medium for performing the method of operating a tissue processor according, to steps 80-86 of FIG. 11.

In preferred embodiments of the invention, the computer readable code can perform any of the additional method steps described above and with reference to FIGS. 11, 12 and 13*a*-*c*, Accordingly, the method of operating the tissue processor 100 can be implemented through the computer program product in software. The computer program code could be supplied in a number of ways, for example on a memory of the tissue processor 100, or on a tangible computer readable medium, or communicated as a data signal or file for the tissue processor 100.

The inventive method, tissue processor and computer program product as described herein advantageously enable reagent quality to be verified before or during operation of a tissue processor to perform a tissue processing protocol with the reagent. The inventive tissue processor includes at least one sensor for measuring a measured purity level of the reagent, which is preferably a concentration value derived from the measured parameter value. Accordingly, the actual reagent concentration level can be determined, by means of the at least one sensor, before or during operation of the tissue processor 100 to perform the tissue processing protocol. The determined reagent concentration level can be used by a reagent management system to more readily control reagent use and tissue processor workflows for performing tissue processing protocols. The invention can therefore improve the likelihood of successful tissue processing by avoiding user error and potential suboptimal tissue processing through verifying reagent quality.

Improvements in Basket Design

The present invention also provides improvements in cassette basket design for tissue processors.

Referring to FIGS. 4 to 6, the retort 12 of the prior art tissue processor 10 includes three fluid level sensors 52 for detecting the level of process fluid, such as reagents, in the retort 12. The fluid level sensors 52 are positioned at different heights of the retort 12 as best shown in FIG. 6. Multiple baskets 62 are configured to be accommodated and stacked in the retort 12 as shown in FIG. 5. The baskets 62 are sufficiently sized for positioning within the retort 12 and to maximise the volume capacity for storing tissue samples, which may be stored in the baskets 62 within cassettes. The prior art baskets 62 are usually made of a metallic material, and thus provide a reflective structure when exposed to light. Since the fluid level sensors 52 are typically optical sensors, the metallic reflective structure can interfere with the optical sensors for use in determining the level of the process fluid.

The present invention provides a container 110 for storing tissue samples for processing in a tissue processor (such as the prior art tissue processor 10 or inventive tissue processor 100). The container 110 is configured to be accommodated in a retort 12, 14 of the tissue processor 10, 100 and provide access to the stored tissue samples for processing with a process fluid in the retort 12, 14. The retort 12, 14 includes at least one sensor 52 for detecting a level of the process fluid in the retort 12, 14. The container 110 is configured to minimise interference with the at least one sensor 52.

FIGS. 14a-b and 15a-b illustrate a container 110 for storing tissue samples for processing in a tissue processor according to a preferred embodiment of the invention. The container 110 can be sufficiently sized for positioning within a retort 12, 14. Furthermore, the container 110 can be a basket as shown in FIGS. 14a-b and 15a-b or have a netted structure in order to provide fluid access to the stored tissue samples for processing.

In some embodiments, the at least one sensor 52 is an optical sensor, and the container 110 includes at least one non-reflective surface for minimising interference with the optical sensor 52 (not shown). The non-reflective surface preferably includes an opaque material in order to minimise reflections that can occur during use of the optical sensor 52 (not shown). In other embodiments, the sensor 52 can be other sensors that are affected by interference from surface reflections as known to a person skilled in the art.

The container 110 can be configured to releasably receive one or more clips having the at least one non-reflective surface (not shown). Where the container 110 is a basket, as shown in FIGS. 14a-b and 15a-b, the one or more clips can releasably attach to openings in side portions of the basket 110 (not shown). The side portions can include the four surfaces of the receptacle 60 of the basket 110 that exclude base portion 63. Additionally/alternatively, the side portions of the container or basket 110 can each include the non-reflective surface, which may be integral with the container 110 (not shown). The side portions are preferably formed of a non-reflective or opaque material in these embodiments.

The present invention also provides a container 110 for storing tissue samples for processing in a tissue processor 10, 100 that includes a retractable handle 65 to facilitate stacking of a plurality of the containers 110.

Figure 14A:
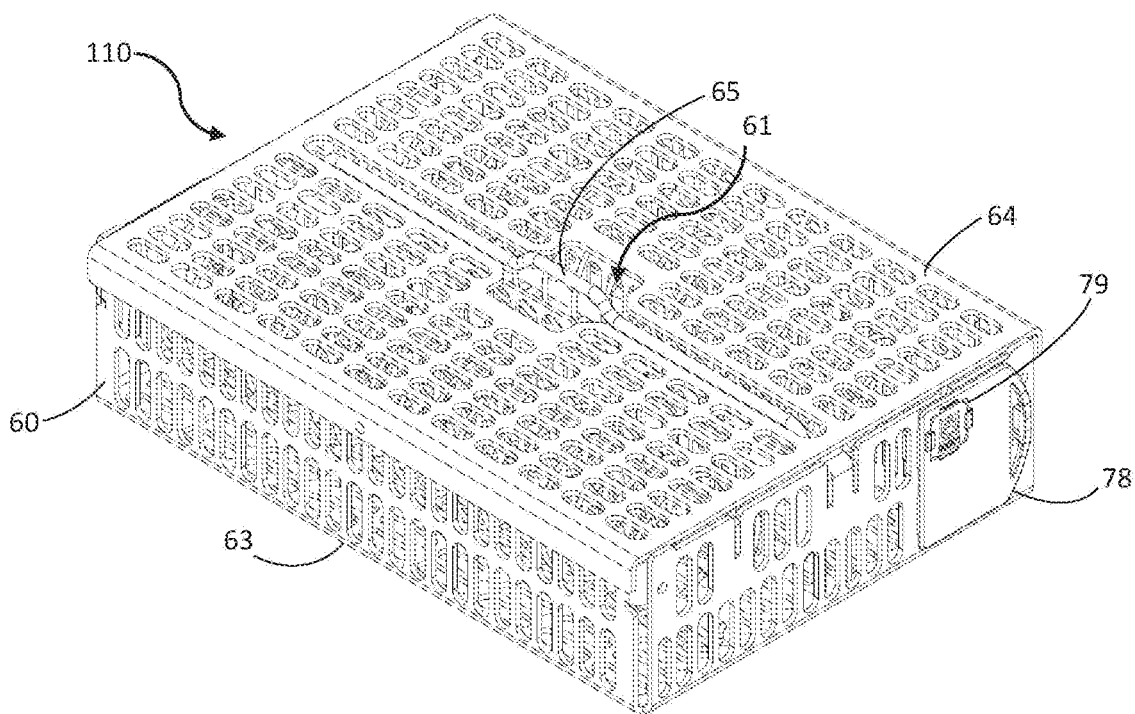
FIGS. 14a and 14b are perspective views of a container for storing tissue samples with a retracted handle, showing top and bottom views, respectively, according to embodiments of the invention.
Figure 14B:
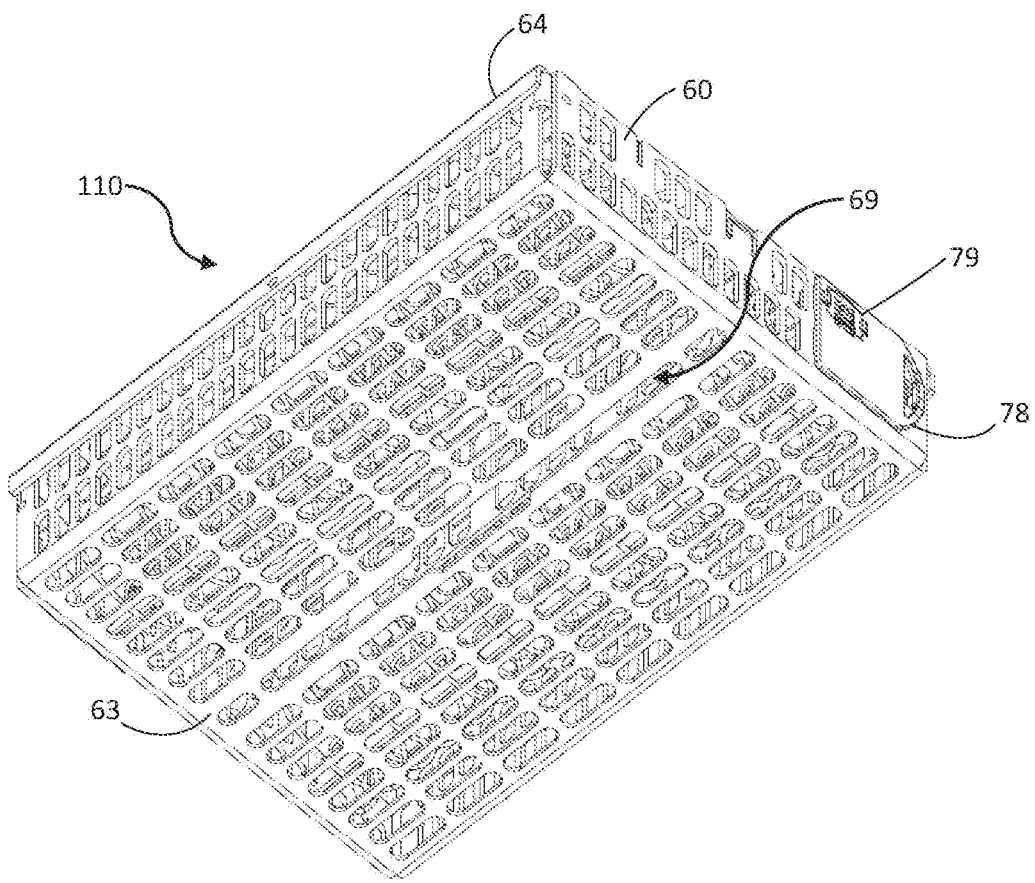
Figure 15A:
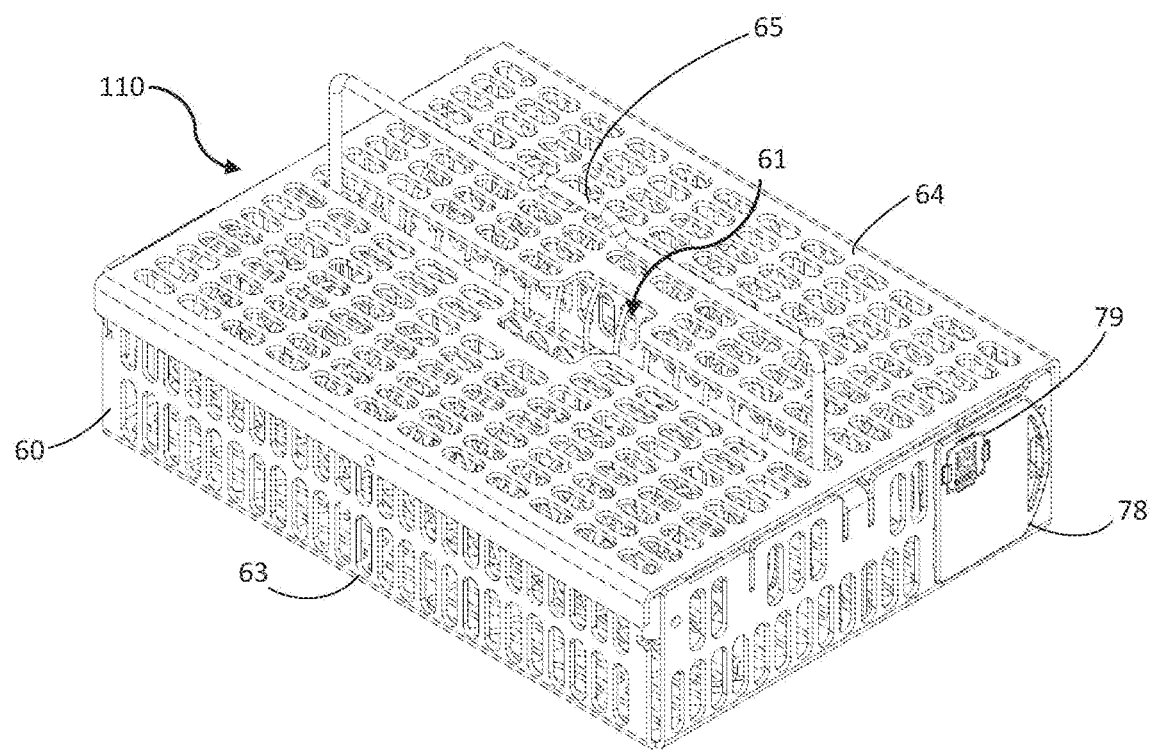
FIGS. 15a and 15b are perspective views of the container for storing tissue samples of FIGS. 14a and 14b showing an extended handle, with and without a lid, respectively, according to embodiments of the invention.
Figure 15B:
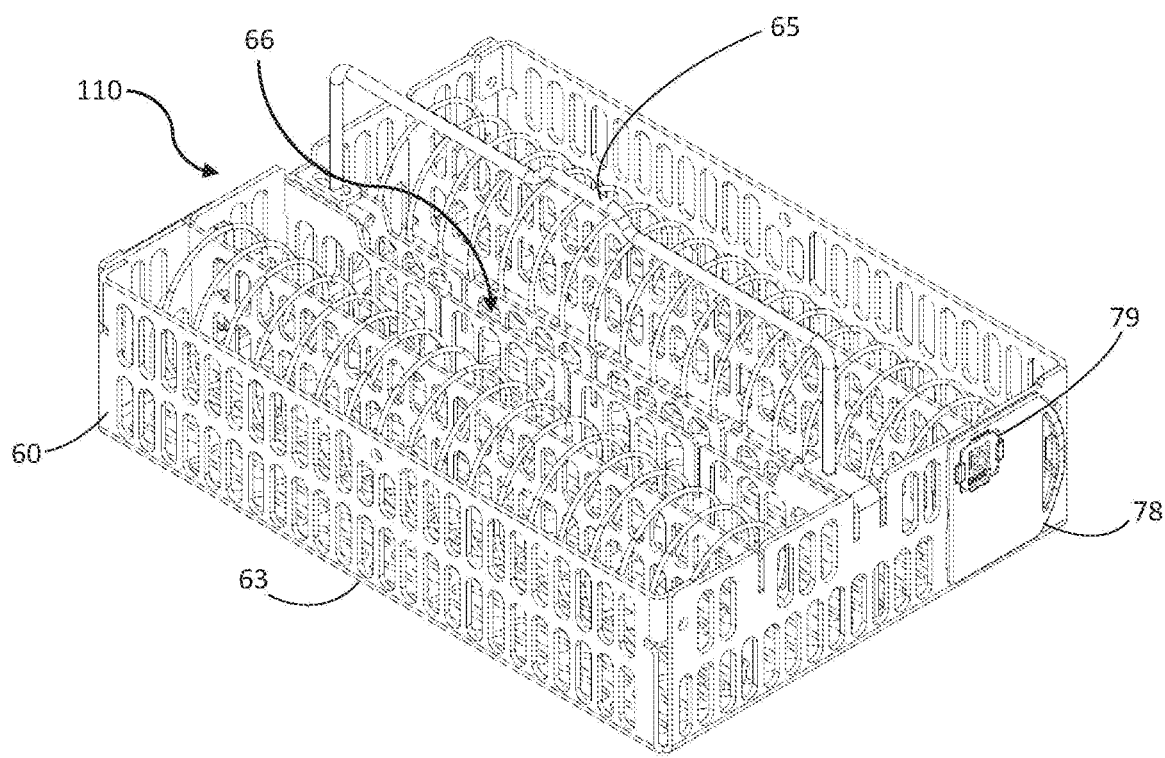

FIGS. 14a-b and 15a-b illustrate the container 110 for storing tissue samples according to a preferred embodiment of the invention, showing the retractable handle 65. FIGS. 14a-b show the handle 65 in the retracted position and FIGS. 15a-b show the handle 65 in the extended position. The container 110 can be sufficiently sized for positioning within a retort 12, 14 and be a basket or have a netted structure in order to provide fluid access to the stored samples for tissue processing. The container or basket 110 as illustrated includes a receptacle 60 and lid 64. As best shown in FIG. 15b, the receptacle 60 can include a central recess 66 for receiving the handle 65 in the retracted position. The central recess 66 forms a longitudinal slot for receiving arms of the handle 65 at opposite ends of the slot in the retracted position.

Preferably, the handle 65 is integral with the receptacle 60 as shown in FIGS. 14a-b and 15a-b. In particular, FIG. 15b illustrates that the receptacle 60 can include brackets at opposite ends of the longitudinal slot 66 for receiving, in an opening of the bracket, each arm of the handle 65. The handle 65 is extended and retracted by manually pushing and pulling the handle 65 with respect to the receptacle 60 so as to move the arms of the handle 65 relative to the openings of the brackets. Integrating the handle 65 into the receptacle 60 can avoid any dependency on secure attachment of a lid 64, thereby reducing the risk of dropping the container 110 and/or tissue samples during transport.

Referring to FIG. 14a, the container or basket 110 can further include a lid 64 having a slot 61 through which the handle is extendable to the extended position shown in FIG. 15a. The slot 61 can be a longitudinal slot which is slightly longer than a length of the handle 65 in order to allow the handle 65 to pass through to the extended position while minimising the gap therebetween through which tissue samples could exit the receptacle 60. The slot 61 is centrally positioned as shown in FIGS. 14a and 15a for stability of the container 110 when carried by the handle 65. The slot 61 can also be shaped to include a wider portion in a centre part of the lid 64 for receiving a curved portion of the handle 65.

Referring to FIG. 14b, the receptacle 60 can include a base portion 63 having a slot 69 in a central portion thereof. The slot 69 is sized for receiving at least part of a handle 65 of a corresponding container or basket 110. For example, as shown in FIG. 14a, part of the handle 65 may protrude through the slot 61 of the lid 64, particularly in the centre part of the lid 64, in the retracted position. The slot 69 of the receptacle 60 can receive the protruding part of the handle 65 to facilitate stacking of a plurality of the containers 110. This advantageously enables the base portion 63 and lid 64 to sit substantially flush when a plurality of containers 110 are vertically stacked.

The container 110 can also include an electronic identifier 79 for use in tracking the location of the container 110 during sample processing. The electronic identifier 79 can include a barcode, or more preferably, a Radio Frequency identification Device (RFID) tag as shown in FIGS. 14a-b and 15a-b. In some embodiments, the electronic identifier 79 is provided on a tag 78 which is attached to the receptacle 60 of the basket 110. Preferably, the tag 78 is attached to a side portion of the receptacle 60 (excluding the base portion 63) so as to minimise interference with the handle 65 and can be easily read when a plurality of containers 110 are vertically stacked.

Advantageously, the inventive container 110 for storing tissue samples minimises interference with fluid sensors 52 of the tissue processor 10, 100, such as by preferably providing at least one non-reflective surface. Furthermore, the inventive container 110 provides a retractable handle so that a plurality of containers 110 can be readily stacked for transport or use in the tissue processor 10, 100.

Additional non-limiting exemplary embodiments of the disclosure are set forth below.

Embodiment 1: A method of operating a tissue processor for processing tissue samples, the tissue processor including: at least one retort for receiving tissue samples; at least one container for storing a reagent; and at least one sensor arranged for fluid communication with one or both of the at least one container and the at least one retort for measuring a measured purity level of a reagent, the method including the steps of: a) conducting reagent from the at least one container or the at least one retort to the at least one sensor; b) automatically measuring, by means of the at least one sensor, a measured purity level of the reagent; c) checking whether the measured purity level meets a predetermined purity level of the reagent associated with the at least one container; and d) automatically determining, based on a result of the checking, whether the reagent is suitable for processing tissue samples in the tissue processor.

Embodiment 2: The method according to Embodiment 1, further including the step of: providing the predetermined purity level of the reagent based on reagent data for the at least one container.

Embodiment 3: The method according to Embodiment 2, further including the step of: receiving, at the tissue processor, the reagent data for the at least one container from a user.

Embodiment 4: The method according to Embodiment 3, wherein the tissue processor further includes an input device, and the receiving step includes receiving the reagent data by means of the input device.

Embodiment 5: The method according to any one of Embodiments 2 to 4, wherein the reagent data includes at least a concentration value of the reagent.

Embodiment 6: The method according to. Embodiment 5, wherein the predetermined purity level of the reagent is a concentration level determined based on the concentration value from the reagent data.

Embodiment 7: The method according to Embodiment 6, wherein the concentration level is one of: a threshold value, wherein the threshold value is the concentration value from the reagent data; or a tolerance range of values determined based on the concentration value from the reagent data.

Embodiment 8: The method according to any one of Embodiments 1 to 7, wherein the at least one sensor measures at step b) a density value that represents the measured purity level of the reagent.

Embodiment 9: The method according to Embodiment 8, further including the steps of: repeating the measuring step b) one or more times; and calculating an average of the measured density values, wherein the calculated average represents the measured purity level of the reagent.

Embodiment 10: The method according to Embodiment 9, wherein the measured purity level is a concentration value derived from the measured density value or the average of the measured density values.

Embodiment 11: The method according to any one of Embodiments 7 to 10 when Embodiment 8 includes the method according to Embodiment 7, wherein the checking step c) includes checking whether the measured purity level is (i) greater than the threshold value, or (ii) within the tolerance range of values.

Embodiment 12: The method according to Embodiment 11, wherein the automatically determining step d) includes: determining that the reagent is suitable for processing tissue samples when the measured purity level is greater than the threshold value or within the tolerance range of values; and determining that the reagent is unsuitable for processing tissue samples when the measured purity level is less than the threshold value or falls outside the tolerance range of values.

Embodiment 13: The method according to any one of Embodiments 1 to 12, wherein when the reagent is determined to be unsuitable for processing tissue samples, the method further includes the step of: flagging the at least one container for non-use by the tissue processor.

Embodiment 14: The method according to Embodiment 13, further including the step of: generating, at the tissue processor, a notification signal for a user to check the reagent in the flagged container.

Embodiment 15: The method according to any one of Embodiments 1 to 14, which is performed prior to operating the tissue processor to perform a tissue processing protocol using the reagent.

Embodiment 16: The method according to any one of Embodiments 1 to 15, wherein the tissue processor includes a dedicated line connecting the at least one container or the at least one retort to the at least one sensor, and wherein the conducting step a) includes conducting reagent in the dedicated line from the at least one container or the at least one retort to the at least one sensor.

Embodiment 17: The method according to any one of Embodiments 1 to 14, which is performed when operating the tissue processor to perform a tissue processing protocol using the reagent.

Embodiment 18: The method according to any one of Embodiments 1 to 14 and 17, wherein the tissue processor includes a reagent line connecting the at least one container and the at least one retort, wherein the at least one sensor is arranged for fluid communication with the reagent line, and wherein the conducting step a) includes conducting reagent in the reagent line between the at least one container and the at least one retort.

Embodiment 19: The method according to Embodiment 18, wherein the at least one sensor is one of: positioned in the reagent line; or positioned in a bypass line that receives a portion of the reagent when the reagent is conducted in the reagent line.

Embodiment 20: The method according to any one of Embodiments 1 to 14 and 17 to 19, which is performed on one or both of: filling of the at least one retort with reagent; and draining of the at least one retort to remove reagent.

Embodiment 21: The method according to Embodiment 20, further including the step of: operating the tissue processor to stop filling or draining of the at least one retort to perform at least steps (b)-(d).

Embodiment 22: The method according to Embodiment 21, wherein operating the tissue processor to stop filling or draining includes one or both of: operating the tissue processor to stop filling prior to reagent contacting tissue samples stored in the at least one retort; and operating the tissue processor to stop filling prior to reagent being delivered to the at least one container.

Embodiment 23: The method according to Embodiment 21 or Embodiment 22, wherein when the reagent is determined to be suitable for processing tissue samples, the method further includes the step of: operating the tissue processor to continue filling or draining of the at least one retort to complete the tissue processing protocol.

Embodiment 24: The method according to any one of Embodiments 21 to 23, wherein when the reagent is determined to be unsuitable for processing tissue samples, the method further includes the step of: operating the tissue processor to abandon the tissue processing protocol.

Embodiment 25: The method according to any one of Embodiments 1 to 14 and 17 to 24, wherein the tissue processor includes a first container for storing a first reagent and a second container for storing a second reagent, and wherein the method further includes the steps of: operating the tissue processor to perform a tissue processing protocol using the first reagent and the second reagent; and automatically determining a carry over volume of the first reagent from the first container into the second reagent from the second container.

Embodiment 26: The method according to Embodiment 25, wherein automatically determining the carry over volume includes the steps of: providing an initial volume of the second reagent in the second container; and performing the measuring step b) to measure the following: a density value of the first reagent on draining of the at least one retort; a density value of the second reagent on filling of the at least one retort; and a density value of the second reagent on draining of the at least one retort, wherein the carry over volume is calculated according to;

$$V_{CO} = \frac{\rho_{C2_{out}} - \rho_{C2_{in}}}{\rho_{C1_{out}} - \rho_{C2_{out}}} \times V$$

wherein: $V_{CO}$=volume of carry over (L), $\rho_{C2_{out}}$=measured density value of the second reagent on draining of the at least one retort (kg/m$^3$), $\rho_{C2_{in}}$=measured density value of the second reagent on filling of the at least one retort (kg/m$^3$), $\rho_{C1_{out}}$=measured density value of the first reagent on draining of the at least one retort (kg/m$^3$), and V=initial volume of the second reagent in the second container (L).

Embodiment 27: A computer program product including: a computer readable medium having computer readable program code and computer readable system code embodied on the medium for, operating a tissue processor, within a data processing system, the computer program product including: computer readable code within the computer readable medium for performing the method steps of any one of Embodiments 1 to 26.

Embodiment 28: A tissue processor for processing tissue samples, including: at least one retort for receiving tissue samples; at least one container for storing a reagent; at least one sensor arranged for fluid communication with one or both of the at least one container and the at least one retort for measuring a measured purity level of a reagent; and a controller configured to: conduct reagent from the at least one container or the at least one retort to the at least one sensor; measure, by means of the at least one sensor, a measured purity level of the reagent; check whether the measured purity level meets a predetermined purity level of the reagent associated with the at least one container; and determine, based on a result of the checking, whether the reagent is suitable for processing tissue samples in the tissue processor.

Embodiment 29: The tissue processor according to Embodiment 28, wherein the controller is further configured to: provide the predetermined purity level of the reagent based on reagent data for the at least one container.

Embodiment 30: The tissue processor according to Embodiment 29, wherein the controller is further configured to: receive, at the tissue processor, the reagent data for the at least one container from a user.

Embodiment 31: The tissue processor according to Embodiment 30, further including an input device, and wherein the controller is configured to receive the reagent data by means of the input device.

Embodiment 32: The tissue processor according to any one of Embodiments 29 to 31, wherein the reagent data includes at least a concentration value of the reagent.

Embodiment 33: The tissue processor according to Embodiment 32, wherein the predetermined purity level of the reagent is a concentration level determined based on the concentration value from the reagent data.

Embodiment 34: The tissue processor according to Embodiment 33, wherein the concentration level is one of: a threshold value, wherein the threshold value is the concentration value; or a tolerance range of values determined based on the concentration value.

Embodiment 35: The tissue processor according to any one of Embodiments 28 to 34, wherein the at least one sensor measures a density value that represents the measured purity level of the reagent.

Embodiment 36: The tissue processor according to Embodiment 35, wherein the controller is configured to measure, by means of the at least one sensor, the density value that represents the measured purity level of the reagent two or more times, and is further configured to: calculate an average of the measured density values, wherein the calculated average represents the measured purity level of the reagent.

Embodiment 37: The tissue processor according to Embodiment 36, wherein the measured purity level is a concentration value derived from the measured density value or the average of the measured density values.

Embodiment 38: The tissue processor according to any one of Embodiments 34 to 37 when Embodiment 35 includes the method according to Embodiment 34, wherein the controller checks whether the measured purity level is (i) greater than the threshold value, or (ii) within the tolerance range of values.

Embodiment 39: The tissue processor according to Embodiment 38, wherein the controller determines that the reagent is suitable for processing tissue samples when the measured purity level is greater than the threshold value or within the tolerance range of values, and wherein the controller determines that the reagent is unsuitable for processing tissue samples when the measured purity level is less than the threshold value or falls outside the tolerance range of values.

Embodiment 40: The tissue processor according, to any one of Embodiments 28 to 39, wherein when the reagent is determined to be unsuitable for processing tissue samples, the controller is further configured to: flag the at least one container for non-use by the tissue processor.

Embodiment 41: The tissue processor according to Embodiment 40, wherein the controller is further configured to: generate, at the tissue processor, a notification signal for a user to check the reagent in the flagged container.

Embodiment 42: The tissue processor according, to any one of Embodiments 28 to 41, wherein the controller determines whether the reagent is suitable for processing tissue samples prior to operating the tissue processor to perform a tissue processing protocol using the reagent.

Embodiment 43: The tissue processor according to any one of Embodiments 28 to 42, wherein the tissue processor includes a dedicated line connecting the at least one container or the at least one retort to the at least one sensor, and wherein the controller conducts reagent in the dedicated line from the at least one container or the at least one retort to the at least one sensor.

Embodiment 44: The tissue processor according to any one of Embodiments 28 to 41, wherein the controller determines whether the reagent is suitable for processing tissue samples when operating the tissue processor to perform a tissue processing protocol using the reagent.

Embodiment 45: The tissue processor according to any one of Embodiments 28 to 41 and 44, wherein the tissue processor includes a reagent line connecting the at least one container and the at least one retort, wherein the at least one sensor is arranged for fluid communication with the reagent line, and wherein the controller conducts reagent in the reagent line between the at least one container and the at least one retort.

Embodiment 46: The tissue processor according to Embodiment 45, wherein the at least one sensor is one of: positioned in the reagent line; or positioned in a bypass line that receives a portion of the reagent when the reagent is conducted in the reagent line.

Embodiment 47: The tissue processor according to any one of Embodiments 28 to 41 and 44 to 47, wherein the controller determines whether the reagent is suitable for processing tissue samples during one or both of: filling of the at least one retort with reagent; and draining of the at least one retort to remove reagent.

Embodiment 48: The tissue processor according to Embodiment 47, wherein the controller is further configured to: operate the tissue processor to stop filling or draining of the at least one retort to determine whether the reagent is suitable for processing tissue samples.

Embodiment 49: The tissue processor according to Embodiment 48, wherein the controller operates the tissue processor to stop filling or draining by one or both of: operating the tissue processor to stop filling prior to reagent contacting tissue samples stored in the at least one retort; and operating the tissue processor to stop filling prior to reagent being delivered to the at least one container.

Embodiment 50: The tissue processor according to Embodiment 48 or Embodiment 49, wherein when the controller determines that the reagent is suitable for processing tissue samples, the controller is further configured to: operate the tissue processor to continue filling or draining of the at least one retort to complete the tissue processing protocol.

Embodiment 51: The tissue processor according, to any one of Embodiments 48 to 50, wherein when the controller determines that the reagent is unsuitable for processing tissue samples, the controller is further configured to: operate the tissue processor to abandon the tissue processing protocol.

Embodiment 52: The tissue processor according to any one of Embodiments 28 to 41 and 44 to 51, wherein the tissue processor includes a first container for storing a first reagent and a second container for storing a second reagent, and wherein the controller is further configured to: operate the tissue processor to perform a tissue processing protocol using the first reagent and the second reagent; and determine a carry over volume of the first reagent from the first container into the second reagent from the second container.

Embodiment 53: The tissue processor according to Embodiment 52, wherein the controller is configured to determine the carry over volume by: receiving an initial volume of the second reagent in the second container; and measuring, by means of the at least one sensor, the following: a density value of the first reagent on draining of the at least one retort; a density value of the second reagent on filling of the at least one retort; and a density value of the second reagent on draining of the at least one retort, wherein the controller calculates the carry over volume according to:

$$V_{CO} = \frac{\rho_{C2_{out}} - \rho_{C2_{in}}}{\rho_{C1_{out}} - \rho_{C2_{out}}} \times V$$

wherein: $V_{CO}$=volume of carry over (L), $\rho_{C2_{out}}$=measured density value of the second reagent on draining of the at least one retort (kg/m$^3$), $\rho_{C2_{in}}$=measured density value of the second reagent on filling of the at least one retort (kg/m$^3$), $\rho_{C1_{out}}$=measured density value of the first reagent on draining of the at least one retort (kg/m$^3$), and V=initial volume of the second reagent in the second container (L).

Embodiment 54: A container for storing tissue samples for processing in a tissue processor, wherein the container is configured to be accommodated in a retort of the tissue processor and provide access to the stored tissue samples for processing with a process fluid in the retort, wherein the retort includes at least one sensor for detecting a level of the process fluid in the retort, and wherein the container is configured to minimise interference with the at least one sensor.

Embodiment 55: The container according to Embodiment 54, wherein the at least one sensor is an optical sensor; and the container includes at least one non-reflective surface for minimising interference with the optical sensor.

Embodiment 56: The container according to Embodiment 55, wherein the container is configured to releasably receive one or more clips having the at least one non-reflective surface.

Embodiment 57: The container according to any one of Embodiments 54 to 56, wherein the at least one non-reflective surface includes an opaque material.

Embodiment 58: A container for storing tissue samples for processing in a tissue processor, wherein the container is configured to be accommodated in a retort of the tissue processor and provide access to the stored tissue samples for processing with a process fluid in the retort, wherein the container includes a retractable handle to facilitate stacking of a plurality of the containers.

Embodiment 59: The container according to Embodiment 58, further including a receptacle having a central recess for receiving the handle in a retracted position.

Embodiment 60: The container according to Embodiment 59, wherein the handle is integral with the receptacle.

Embodiment 61: The container according to Embodiment 59 or Embodiment 60, wherein the receptacle includes a base portion having a slot for receiving at least part of a handle of a corresponding container.

Embodiment 62: The container according to any one of Embodiments 58 to 61, further including a lid having a slot through which the handle is extendable to an extended position.

Embodiment 63: The tissue processor according to any one of Embodiment 28 to 53, further including the container for storing tissue samples according to any one of Embodiments 54 to 62.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

It is to be understood that various modifications, additions and/or alternatives may be made to the parts previously described without departing from the ambit of the present invention as defined in the claims appended hereto.

It is to be understood that the following claims are provided by way of example only, and are not intended to limit the scope of what may be claimed in any future application. Features may be added to or omitted from the claims at a later date so as to further define or re-define the invention or inventions.

The invention claimed is:

1. A tissue processor, comprising:
   at least one retort in which the tissue processor is configured to process tissue samples with a process fluid; and
   a container for storing the tissue samples to be processed in the retort of the tissue processor, the container being configured and sized to be accommodated in the at least one retort of the tissue processor and comprising:
      a receptacle having a central recess which includes a longitudinal slot, and
      a retractable handle configured to be retracted into an interior of the container, such that arms of the handle are received into respective distal ends of the longitudinal slot in the retracted position, the handle being retractable to facilitate stacking of a plurality of the containers;
   wherein the container has a netted structure providing fluid access to the tissue samples stored in the container when the container is accommodated in the at least one retort of the tissue processor.

2. The tissue processor according to claim 1, wherein the receptacle of the container includes a base portion, and the longitudinal slot is formed in the base portion, the longitudinal slot being configured for receiving at least part of a handle of a corresponding container.

3. The tissue processor according to claim 1, wherein the handle of the container is attached to the receptacle.

4. The tissue processor according to claim 3, wherein the receptacle of the container includes a base portion, and the longitudinal slot is formed in the base portion, the longitudinal slot being configured for receiving at least part of a handle of a corresponding container.

5. The tissue processor according to claim 1, wherein the container further comprises:
   a lid attached to and covering an opening of the container,
   wherein the lid comprises a slot that is aligned with the handle, and
   wherein the handle is configured to be retracted into the container through the slot of the lid.

6. The tissue processor according to claim 5,
   wherein the handle of the container is configured to be protruded through the slot of the lid while remaining attached to the container and while the lid is attached to and covering the opening of the container.

7. The tissue processor according to claim 1, wherein side portions of the container are formed of a non-reflective or opaque material.

8. A tissue processor, comprising:
   at least one retort in which the tissue processor is configured to process tissue samples with a process fluid; and
   a container for storing the tissue samples to be processed in the retort of the tissue processor, the container being configured and sized to be accommodated in the at least one retort of the tissue processor and comprising:
      a receptacle having a central recess which includes a longitudinal slot; and
      a retractable handle configured to be retracted into an interior of the container, such that arms of the handle are received into respective distal ends of the longitudinal slot in the retracted position, the handle being retractable to facilitate stacking of a plurality of the containers,
   wherein the container is a basket that provides fluid access to the tissue samples stored in the container when the container is accommodated in the at least one retort of the tissue processor.

9. The tissue processor according to claim 8, wherein the receptacle of the container includes a base portion, and the longitudinal slot is formed in the base portion, the longitudinal slot being configured for receiving at least part of a handle of a corresponding container.

10. The tissue processor according to claim 8, wherein the handle of the container is attached to the receptacle.

11. The tissue processor according to claim 10, wherein the receptacle of the container includes a base portion, and the longitudinal slot is formed in the base portion, the longitudinal slot being configured for receiving at least part of a handle of a corresponding container.

12. The tissue processor according to claim 9, wherein the container further comprises:
    a lid attached to and covering an opening of the container,
    wherein the lid comprises a slot that is aligned with the handle, and
    wherein the handle is configured to be retracted into the container through the slot of the lid.

13. The tissue processor according to claim 12,
    wherein the handle of the container is configured to be protruded through the slot of the lid while remaining attached to the container and while the lid is attached to and covering the opening of the container.

14. The tissue processor according to claim 8, wherein side portions of the container are formed of a non-reflective or opaque material.

* * * * *